United States Patent [19]
Smith et al.

[11] Patent Number: 5,339,691
[45] Date of Patent: Aug. 23, 1994

[54] ULTRASONIC TEST SYSTEM

[75] Inventors: Anthony Smith, Oxnard; Dan Goff, Ventura; Roman Kruchowy, Somis; Carl Rhoads, Ventura, all of Calif.

[73] Assignee: The United States of America as represented by the Secretary of the Navy, Washington, D.C.

[21] Appl. No.: 138,042

[22] Filed: Oct. 13, 1993

Related U.S. Application Data

[63] Continuation-in-part of Ser. No. 860,744, Mar. 25, 1992, abandoned.

[51] Int. Cl.$^5$ .................. G01H 5/00; G01N 29/18
[52] U.S. Cl. .......................... 73/597; 73/609; 73/610; 73/613
[58] Field of Search .............. 73/597, 594, 598, 609, 73/610, 613

[56] References Cited

U.S. PATENT DOCUMENTS

| | | |
|---|---|---|
| 3,537,541 | 11/1970 | Desai et al. ........................ 73/597 |
| 3,641,811 | 2/1972 | Gndedinger, Jr. et al. .......... 73/594 |
| 4,926,870 | 5/1990 | Brandenburger .................... 73/597 |
| 4,930,511 | 6/1990 | Rossman et al. .................... 73/597 |
| 5,143,072 | 9/1992 | Kantorovich et al. ............... 73/597 |
| 5,170,667 | 12/1992 | Takeuchi et al. .................... 73/597 |

Primary Examiner—Thomas P. Noland
Assistant Examiner—J. David Wiggins
Attorney, Agent, or Firm—David S. Kalmbaugh; Melvin J. Sliwka; John L. Forrest, Jr.

[57] ABSTRACT

An ultrasonic system for determining the quality of concrete under water without inaccuracies caused by electromagnetic interference from the ultrasonic generator. An ultrasonic generator applies pulses to the concrete. An ultrasonic detector detects the ultrasonic pulses and produces corresponding signals that are indicative of ultrasonic pulses that have passed through the material. Signal processing circuitry processes the signals to determine the transit time of the ultrasonic pulses through the material. The signal processing circuitry is disabled for a predetermined time after application of each ultrasonic pulse to the material to prevent noise produced by the means for applying ultrasonic pulses to the material from entering the signal processing circuitry and causing spurious measurements.

9 Claims, 10 Drawing Sheets

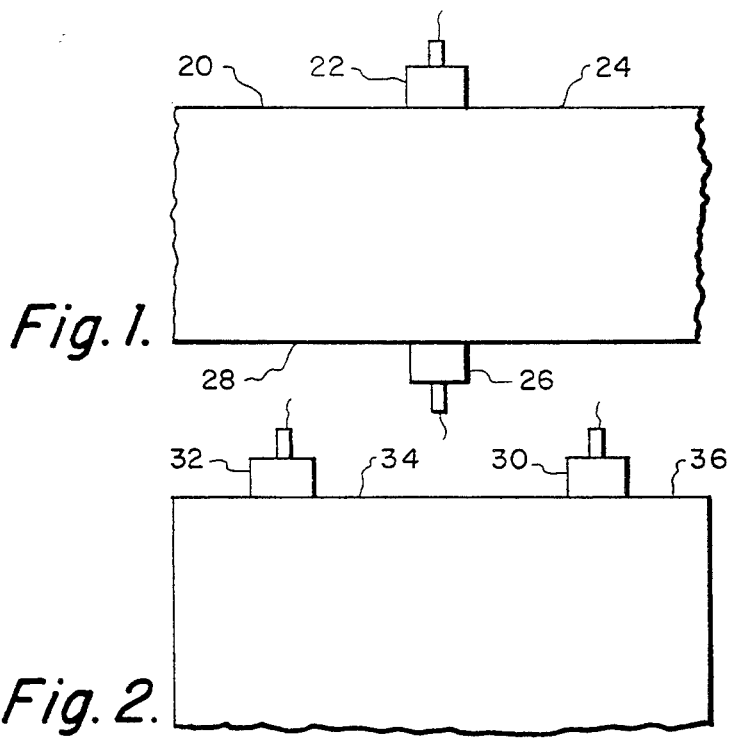
*Fig. 1.*
*Fig. 2.*
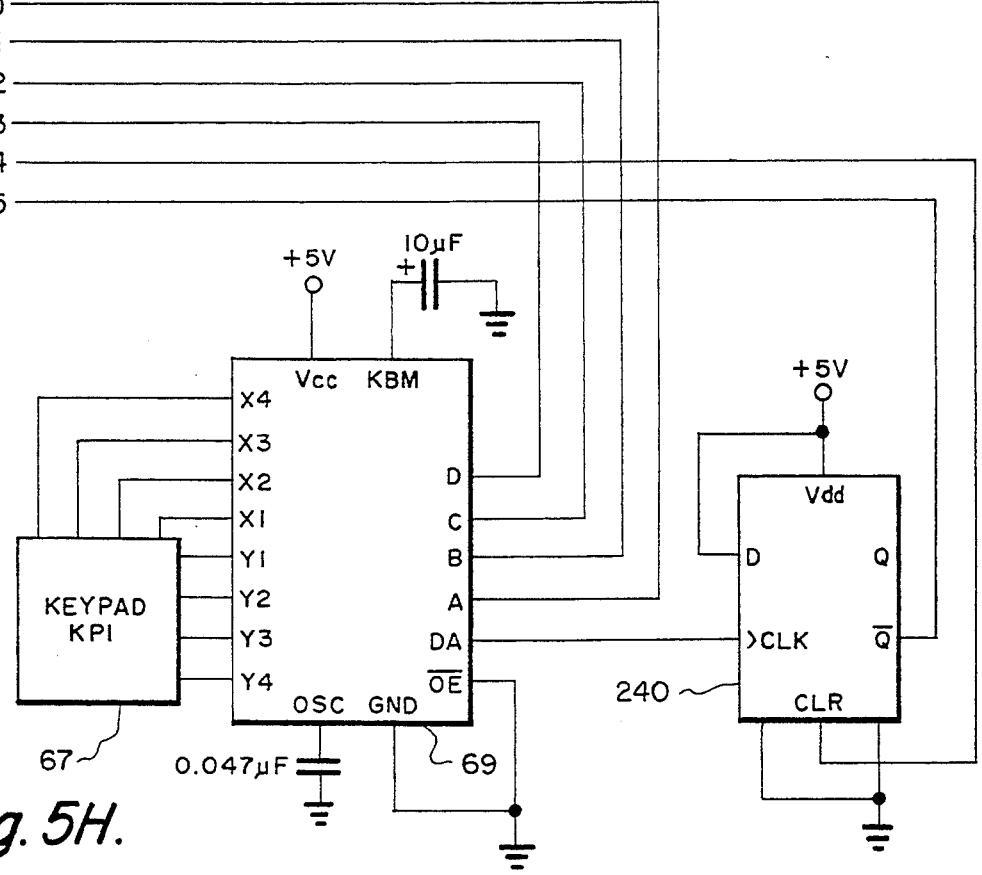
*Fig. 5H.*

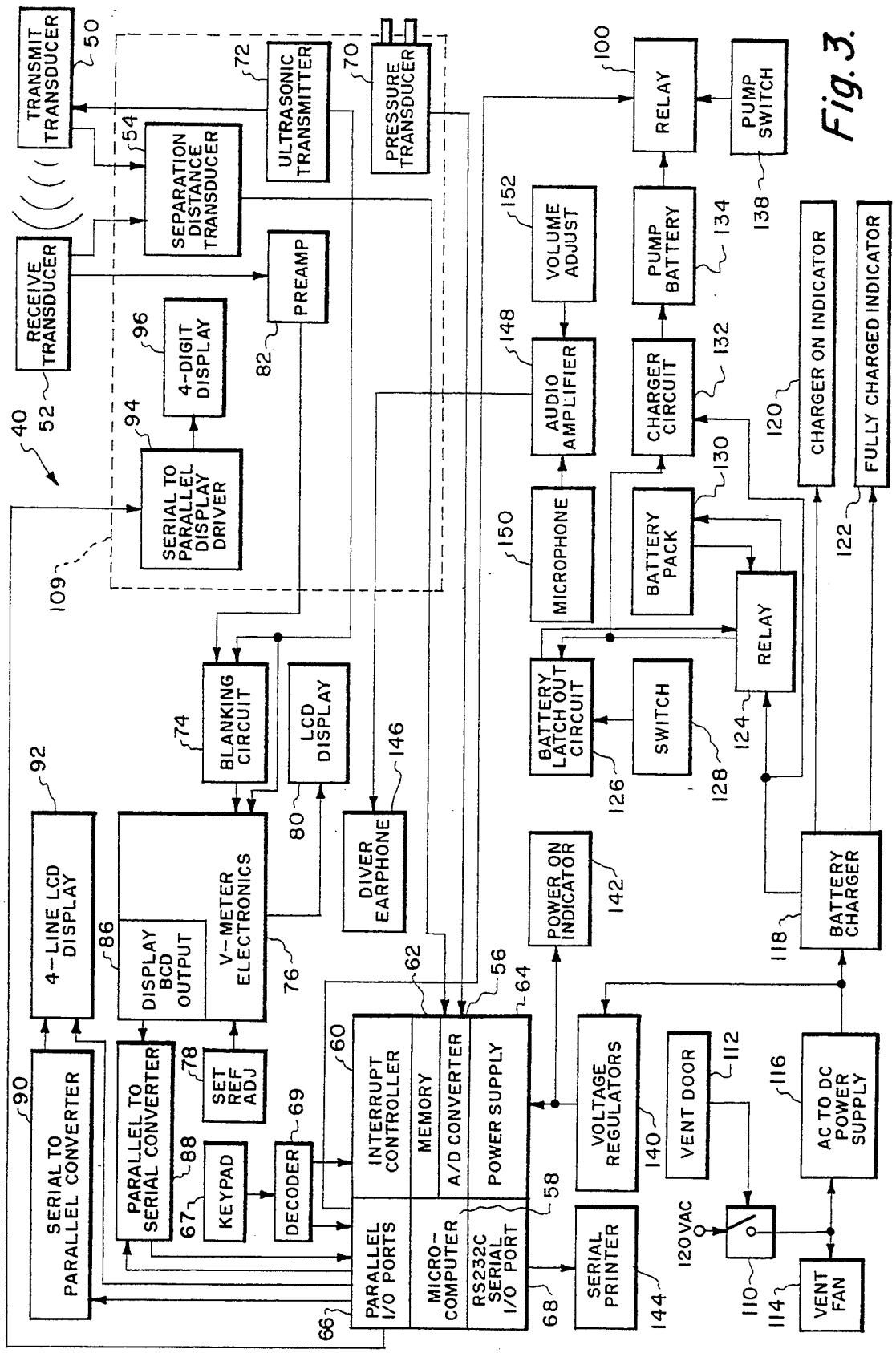

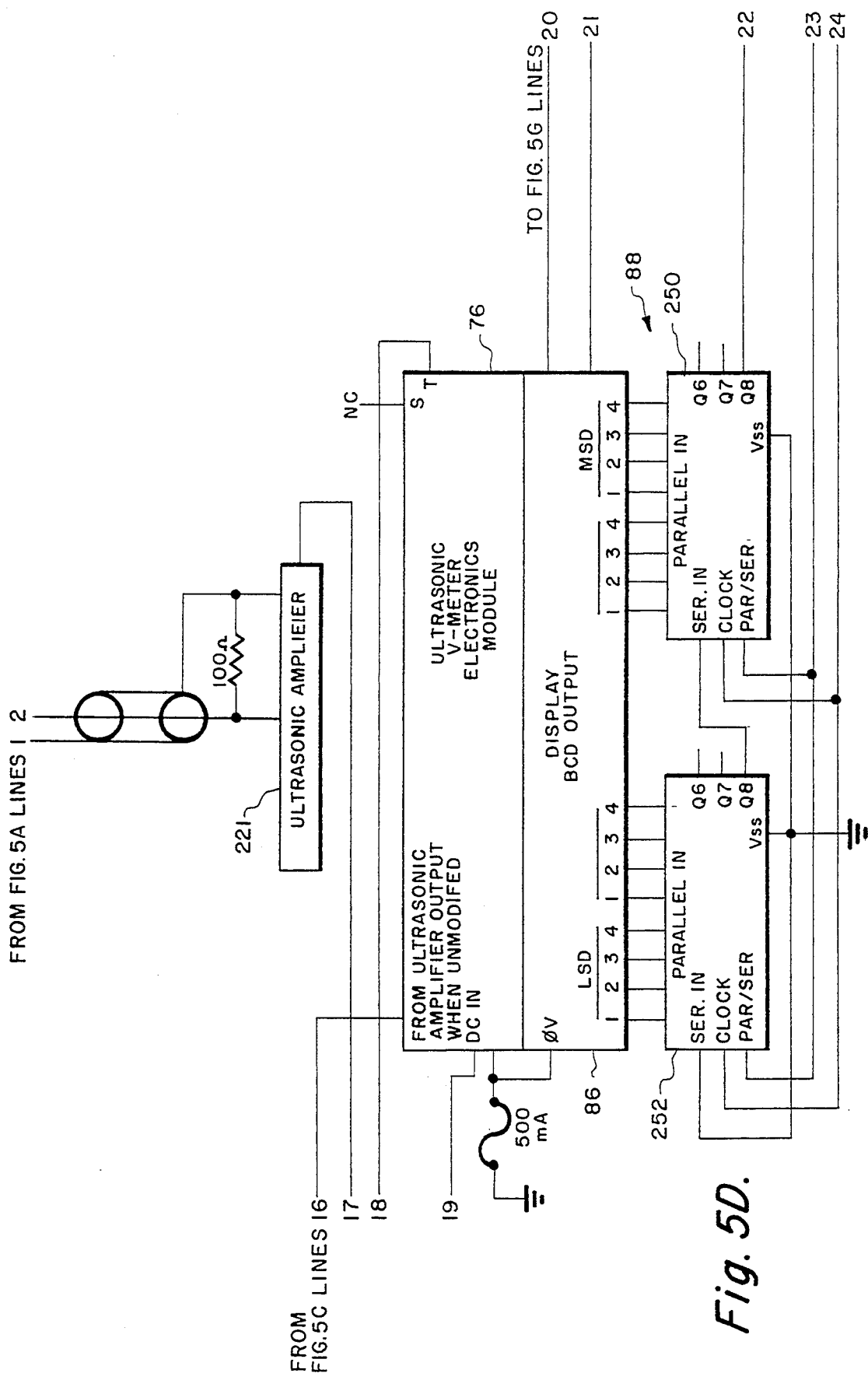

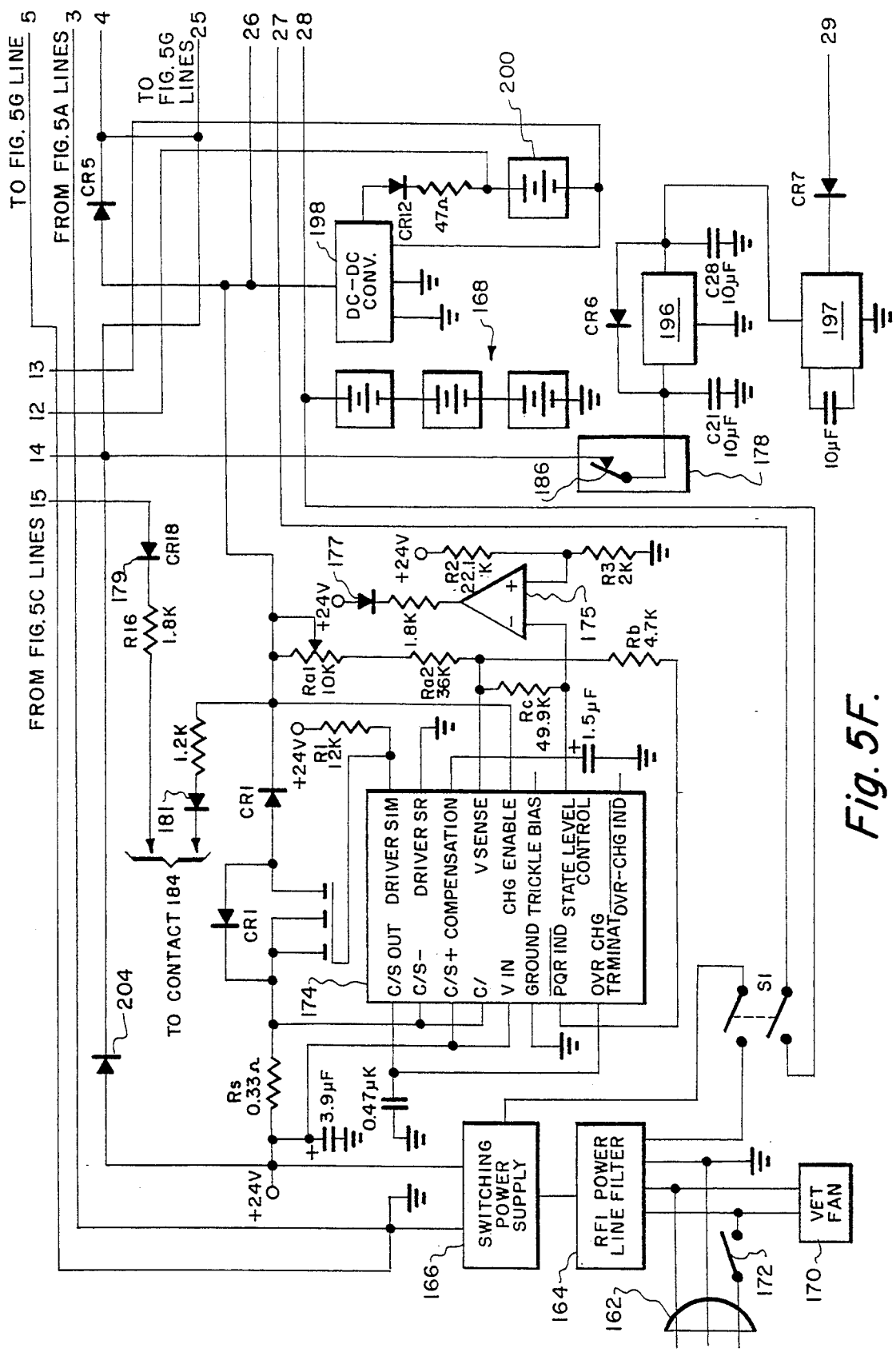

ULTRASONIC TEST SYSTEM

BACKGROUND OF THE INVENTION

This application is a continuation in part of U.S. patent application Ser. No. 07/860,744, filed Mar. 25, 1992, now abandoned.

1. FIELD OF THE INVENTION

This invention relates generally to a system for nondestructive testing of a material such as concrete. In particular, this invention relates to an ultrasonic system for testing the quality of concrete in underwater structures.

2. DESCRIPTION OF THE PRIOR ART

The velocity of ultrasonic pulses traveling in a solid material depends on the density and elastic properties of the material. The quality of some materials is sometimes related to their elastic stiffness so that measurement of ultrasonic pulse velocity in such materials can often be used to determine the elastic properties of the materials. Materials that can be assessed in this manner include concrete and timber. Underwater concrete structures include pier, retaining walls and encasements. Proper maintenance of these and similar structures requires above-water and below-water inspections of the concrete. Visual inspection is the most common underwater inspection technique. Visual inspection has many limitations, particularly in evaluating the internal condition of the structure.

The transit time of high-frequency sound waves through concrete can be used to assess its condition. Ultrasonic test equipment is commercially available for in-air testing. Measuring sound velocity in a non-homogeneous material, such as concrete, requires using separate transmit and receive transducers to avoid energy scattering problems. Sound velocity through the concrete is calculated by measuring the time required to transmit over a known path length. The measurement of average sound velocity through concrete is recommended as a means to establish the uniformity of the concrete being tested.

There are three approaches to measuring sound velocity in concrete. These three approaches are generally known as direct transmission, indirect transmission and semidirect transmission. The most common method is direct transmission where the transducers are positioned on opposite sides of a test specimen. Longitudinal waves propagated directly toward the receiver. For indirect transmission both transducers are placed on the same side of the concrete, and the receive transducer detects energy scattered from discontinuities within the concrete. Semidirect transmission involves placing the transducers on perpendicular surfaces of the structure. Semidirect transmission is not normally used because of difficulties in maintaining a known path length.

Direct transmission of the ultrasonic pulse is the preferred approach for measuring average sound velocity in concrete because direct transmission provides the maximum sensitivity and a well-defined path length. Indirect, or surface, transmission is used only when one surface of the concrete is accessible. A retaining wall is a typical example of a concrete structure where indirect transmission is used. The indirect transmission does not provide a well-defined path length and indicates the quality of the concrete primarily near the concrete surface. The average pulse strength detected in an indirect transmission system is generally less than 5% of the average pulse strength detected for the same path length when direct transmission is used for measuring the quality of the structure's concrete.

A problem often arises in using ultrasonic waves to determine the quality of concrete in that ultrasonic generators produce considerable electromagnetic interference. This electromagnetic interference causes false counts in the counting circuitry that determines the transit time of pulses in the material.

SUMMARY OF THE INVENTION

With the disadvantages inherent in prior art apparatus for measuring the velocity of ultrasonic pulses traveling in a solid concrete structure and thus accessing the quality of the concrete, the present invention was conceived and one of its objects is to provide a reliable and highly accurate measuring apparatus for assessing the quality of concrete in an underwater structure.

Another object of the present invention is to provide an ultrasonic test system for determining the quality of concrete without inaccuracies caused by electromagnetic interference from an ultrasonic generator.

The ultrasonic test system according to the present invention is a battery powered instrument designed to measure the velocity of sound through concrete and provide a general condition assessment rating of the concrete. The ultrasonic test system of the present invention provides information about an underwater concrete structure by allowing a diver to quantify the internal condition of the concrete through the use of ultrasonic sound waves. Ultrasonic sound velocity information is generated when the diver places the faces of transducers on the surfaces of the underwater structure being tested. This information is correlated with the internal condition of the concrete to provide a general condition assessment rating.

An ultrasonic test system for testing the quality of a solid material such as concrete in an underwater structure comprises means for applying ultrasonic pulses to the material and means for detecting the ultrasonic pulses and producing corresponding signals that are indicative of ultrasonic pulses that have passed through the material. The invention further comprises signal processing means for processing the signals to determine the transit time of the ultrasonic pulses through the material and means for disabling the signal processing means for a predetermined time after application of each ultrasonic pulse to the material to prevent noise produced by the means for applying ultrasonic pulses to the material from entering the signal processing means.

BRIEF DESCRIPTION OF THE DRAWINGS

FIG. 1 illustrates placement of a transmitter and a receiver for direct transmission of ultrasonic waves through a concrete structure;

FIG. 2 illustrates placement of a transmitter and a receiver for indirect transmission of ultrasonic waves through a concrete structure;

FIG. 3 is a block diagram of an ultrasonic test system according to the present invention that uses direct transmission of ultrasonic waves through a concrete structure;

FIGS. 5A-5H comprise a schematic circuit diagram of a system that provides for direct transmission of ultrasonic waves through a concrete structure.

DESCRIPTION OF THE PREFERRED EMBODIMENT

Figure 4:
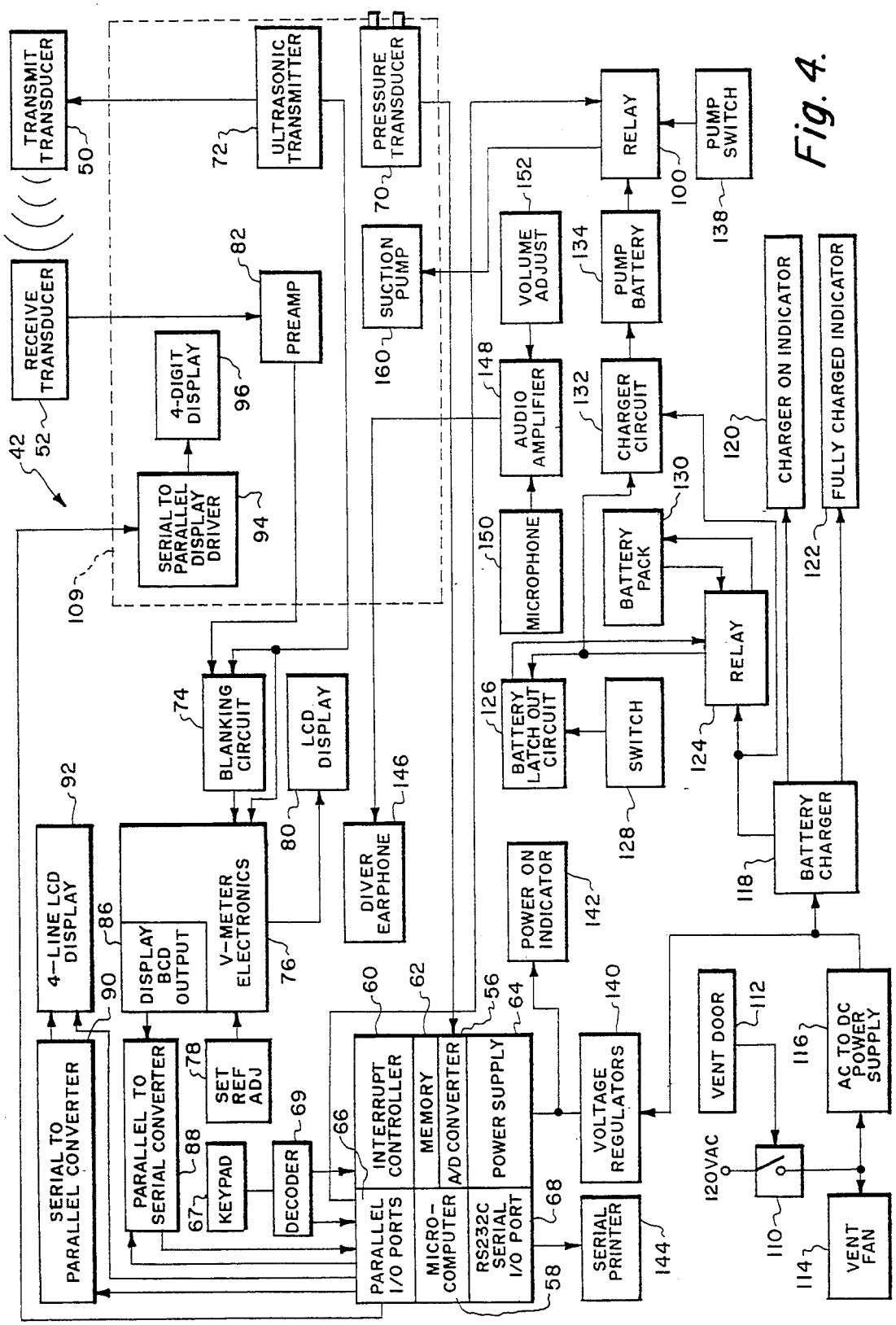
FIG. 4 is a block diagram of an ultrasonic test system according to the present invention that uses indirect transmission of ultrasonic waves through a concrete structure.

Referring to FIG. 1, direct transmission of ultrasonic waves through a concrete structure 20 includes an ultrasonic transmitter 22 placed adjacent to a surface 24 of the concrete structure 20. An ultrasonic receiver 26 is mounted to a surface 28 of the concrete structure 20. Ordinarily in the direct transmission method the surfaces 24 and 28 are parallel.

Referring to FIG. 2, indirect transmission of ultrasonic waves uses an ultrasonic transmitter 30 and an ultrasonic receiver 32 mounted to a generally planar surface 34 of a concrete structure 36.

The velocity of a pulse of longitudinal ultrasonic vibrations in an elastic solid is given by the following expression:

$$V = \left( \frac{E(1-J)}{P(1+J)(1-J)} \right)^{0.5}$$

where
E is the dynamic elastic modulus;
P is the density; and
J is Poisson's ratio for the material.

The above equation generally applies to longitudinal pulse transmission in a solid of any shape or size provided that the smallest dimension measured perpendicular to the path of the pulse is not less than the wavelength of the vibrations that comprise the pulse. The table below gives the condition rating of concrete based on sound velocity.

| Condition Rating | Sound Velocity (ft/sec) |
|---|---|
| Excellent | >15,000 |
| Good | 12,000-15,000 |
| Questionable | 10,000-12,000 |
| Poor | 7,000-10,000 |
| Very Poor | <7,000 |

The block diagrams of FIG. 3 and FIG. 4 illustrate respectively the main components of a direct transmission system 40 and an indirect transmission system 42.

Referring first to FIG. 3, direct transmission system 40 comprises a transmit transducer 50 which produces an ultrasonic wave front that is directed toward a receive transducer 52. The transmit transducer 50 and the receive transducer 52 are connected to a separation distance transducer 54. The separation distance transducer 54 produces a signal indicative of the distance between the transmit transducer 50 and the receive transducer 52. The output of the separation distance transducer 54 is input to an analog to digital converter 56 that is included as a component of a microcomputer 58.

The microcomputer 58 also includes an interrupt controller 60, a memory 62, a power supply 64, parallel input/output ports 66 and an RS-232 serial input/output port 68. A keypad 67 is connected to a decoder 69, which provides its output to the parallel input/output ports 66 and to the interrupt controller 60.

The analog to digital converter 56 also receives pressure signals from a pressure transducer 70. The pressure transducer 70 measures the water depth.

An ultrasonic transmitter 72 provides ultrasonic sound signals to the transmit transducer 50. Signals indicative of the start time of the ultrasonic sound signals are input to a blanking circuit 74. The output of the blanking circuit 74 is connected to a V-meter electronics module 76. The V-meter electronics module 76 receives an input from a set reference adjustment circuit 78 and provides an output to a liquid crystal display 80. The liquid crystal display 80 preferably is a liquid crystal device that provides a display of the time of transmission of ultrasonic pulses from the transmit transducer 50 to the receive transducer 52. Signals output from the ultrasonic transmitter 72 activate the blanking circuit 74 and start the counter circuit within the V-meter electronics module 76.

Signals output from the receive transducer 52 are input to a preamp 82. Signals from the preamp 82 are then input to the blanking circuit 74. Signals output from the blanking circuit 74 are input to the V-meter electronics module 76 with the signals stopping the counter within the V-meter electronics module 76. Signals output form the V-meter electronics module 76 are input to a parallel-to-serial converter 88. The parallel-to-serial converter 88 exchanges input and output signals with the microcomputer 58 via a pair of the parallel input/output ports 66.

One of the parallel input/output ports 66 of microcomputer 58 provides output signals to a serial-to-parallel converter 90. The serial-to-parallel converter 90 provides signals to a 4-line liquid crystal display 92, which also receives signals from the microcomputer 58 via another of the parallel input/output ports 66 of microcomputer 58.

The microcomputer 58 also provides a signal to a serial-to-parallel display driver 94 via one of the parallel input/output ports 66 of microcomputer 58. The serial-to-parallel display driver 94 drives a 4-digit display 96. The display 96 is used to help the diver position the transmit transducer 50 and the receive transducer 52 for optimum results. The serial to parallel display driver 94, the 4-digit display 96, the preamp 82, the separation distance transducer 54, the ultrasonic transmitter 72, and the pressure transducer 70 are mounted in a watertight housing 109.

Power is input to the system via a 120 Volt AC line connected to a switch 110. The switch 110 also receives a signal from a vent door 112. If the vent door 112 is closed, the switch 110 is open and prevents the operation of direct transmission system 40. The output of the switch 110 is input to a vent fan 114 and to an AC to DC power supply 116.

The AC to DC power supply 116 provides DC power to a battery charger 118 that provides signals to a charger on indicator 120, a fully charged indicator 122 and to a relay 124. The relay 124 is connected to a battery latch out circuit 126 to provide signals thereto. A switch 128 is connected to the battery latch out circuit 126 for controlling operation thereof.

The relay 124 is also connected to a battery pack 130. The battery pack 130 is connected to a charger circuit 132, which is in turn connected to a pump battery 134. The pump battery 134 is connected to a relay 100, which also receives an input signal from a pump switch 138 and from the microcomputer 58 via one of the parallel to serial input/output ports 66 of microcomputer 58.

The AC to DC power supply 116 also provides DC power to a voltage regulator 140. The output of the voltage regulator 140 is input to the power supply 64 of the microcomputer 58 and to a power on indicator 142.

The direct transmission system 40 further includes a diver earphone 146 that is driven by an audio amplifier 148. The audio amplifier 148 receives inputs from a microphone 150 and a volume adjust circuit 152. The diver earphone 146 is used to communicate with the diver.

The RS-232 serial input/output port of the microcomputer 58 preferably is connected to a serial printer 144.

Referring now to FIG. 4, an indirect transmission system 42 for testing concrete by means of indirect transmission of ultrasonic waves through the concrete is similar to direct transmission system 40 of FIG. 3 for direct transmission of ultrasonic waves for the concrete structure under test. The indirect transmission system 42 of FIG. 4 does not include a separation distance transducer. In the indirect transmission system 42 the distance between the transmit transducer 50 and the receive transducer 52 is preferably fixed at about 12 inches. The indirect transmission system 42 includes a suction pump 160 that is used to actuate suction cups (not shown) that are used to attach the transmit transducer 50 and the receive transducer 52 to a planar surface, such as the surface 34 shown in Fig. 2.

Ordinarily a minimum of two people are required for proper operation of the ultrasonic test system according to the present invention. A diver positions the transmit transducer 50 and the receive transducer 52 underwater on the structure to be tested. A technician stationed topside operates equipment for receiving and storing the data.

The ship board or top side portion of the direct transmission system 40 comprises a receptacle 162, FIG. 5F, which connects the direct transmission system 40 to an external one hundred twenty volt alternating current power source. Receptacle 162 is connected to a power line filter 164 for filtering the 120 VAC which is then provided to a twenty four volt switching power supply 166 (power supply 116 in FIGS. 3 and 4) through a switch S1. Closure of switch S1 by an operator also connects a battery power supply 168 (battery pack 130 in FIGS. 3 and 4) to the direct transmission system 40. Thus, 18 to 24 VDC which is required to power direct transmission system 40 is provided by either the twenty four volt switching power supply 166 or battery power supply 168 which includes three six volt lead acid rechargeable batteries connected in series. Battery power supply 168 is, in turn, a self contained power source which provides for approximately eight hours of continuous power to direct transmission system 40.

It should be noted that battery power supply 168 is used as a source of power when the ultrasonic test system of the present invention is used underwater to protect the diver using the system.

At this time it should be noted that there is a vent fan 170 (vent fan 114 in FIGS. 3 and 4) electrically connected via a switch 172 (switch 110 in FIGS. 3 and 4) to receptacle 162. Vent fan 170 is used to cool a battery charger 174. Switch 172 is activated by a vent door, not shown, which is a component of the housing for the ship board or top side portion of direct transmission system 40. When the vent door is open switch 172 is in a closed position, as shown in FIG. 5F, and vent fan 170 and power supply 166 are operational.

Figure 5A:
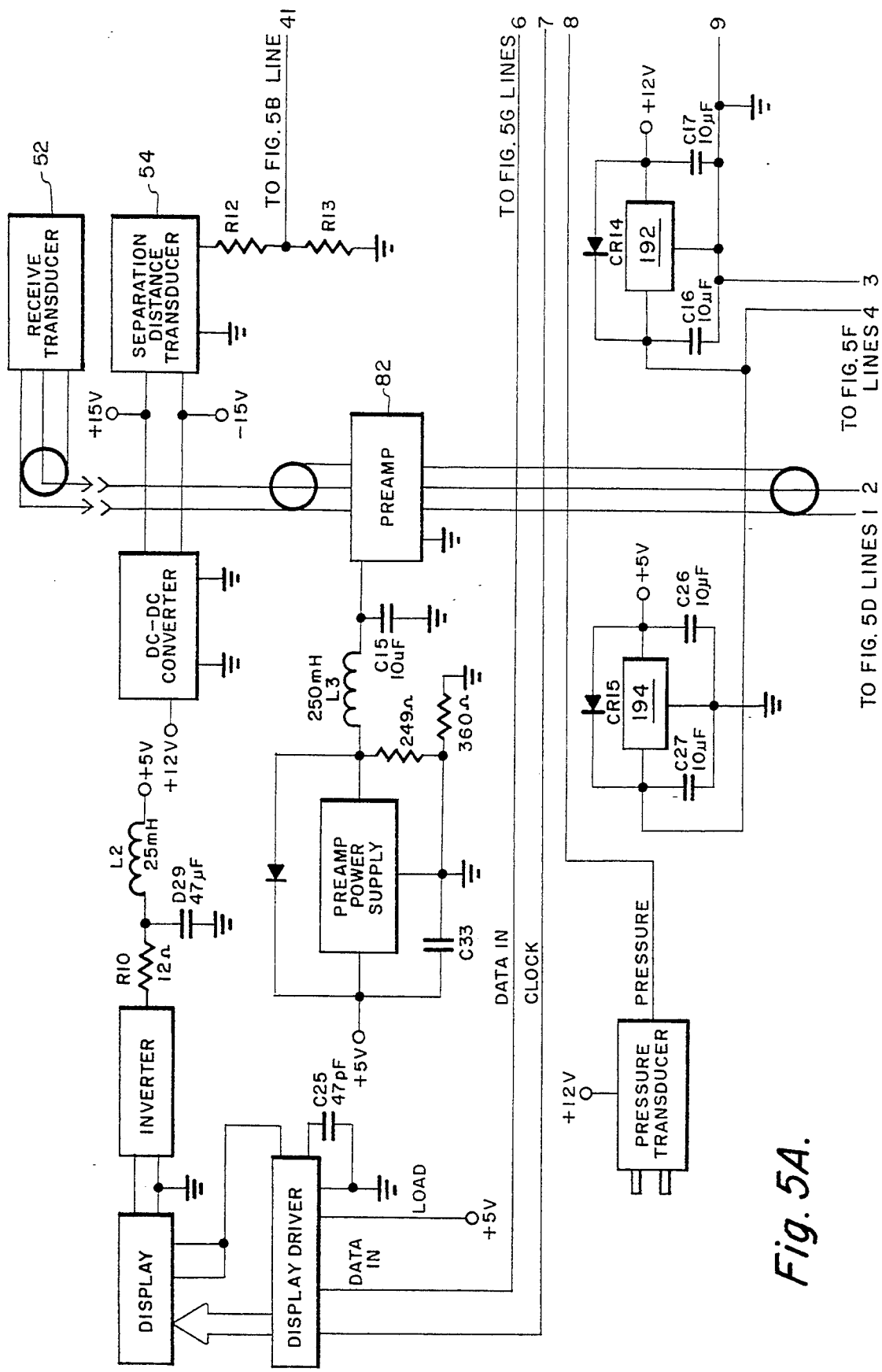
Figure 5B:
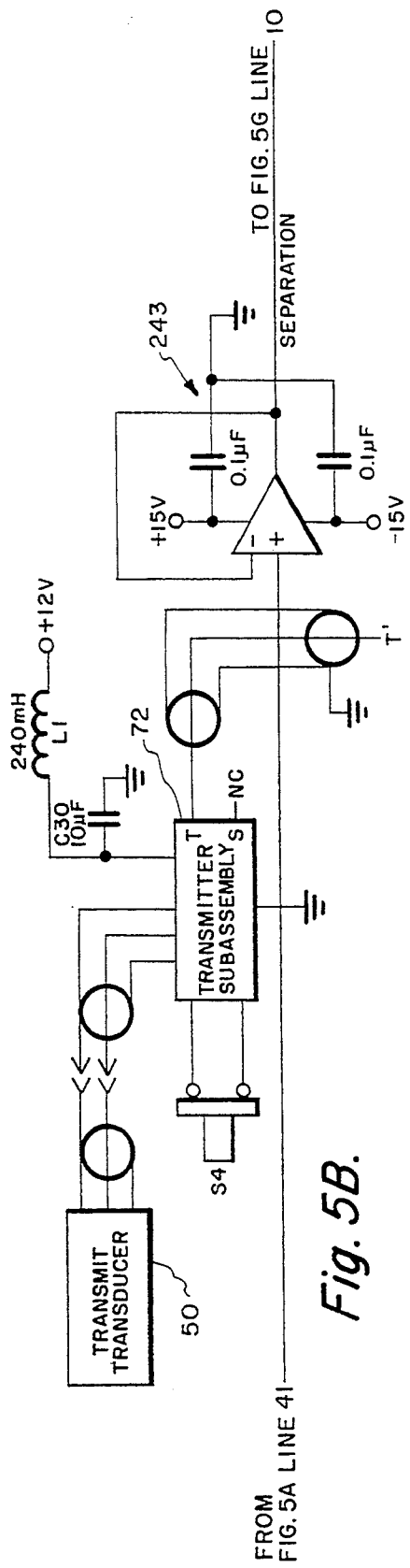
Figure 5E:
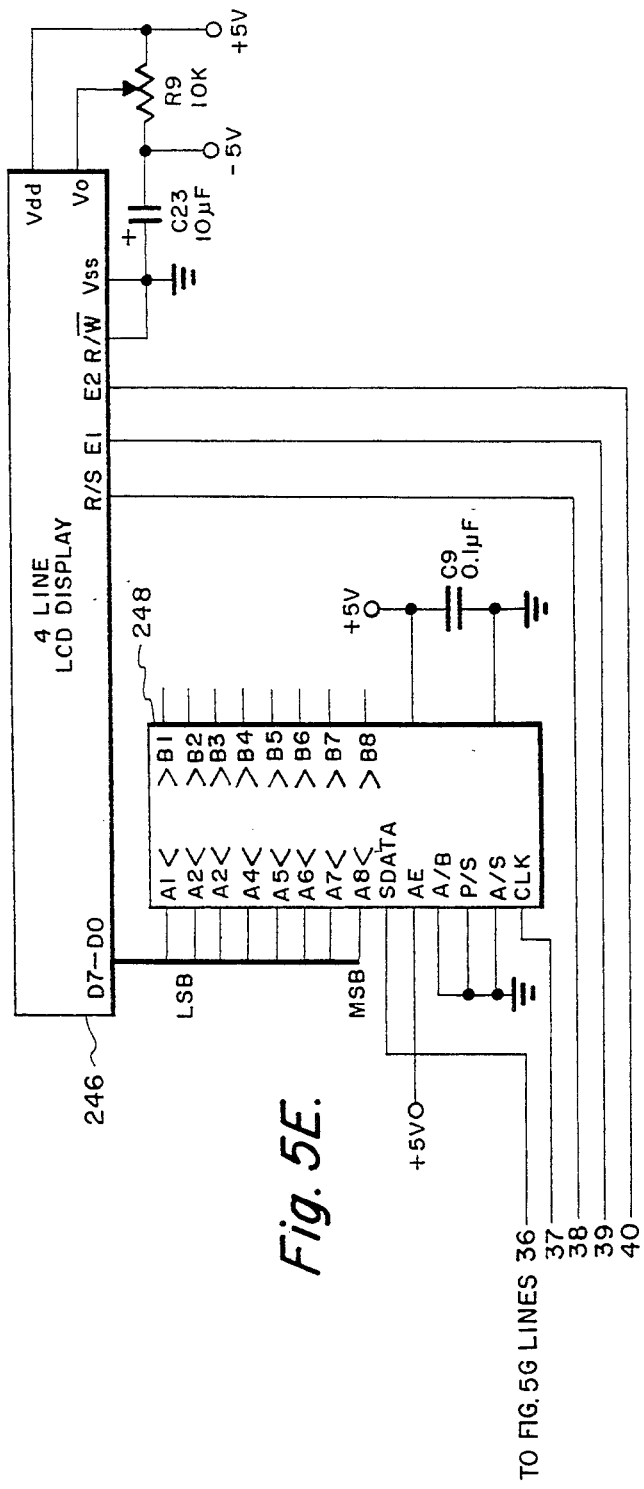
Figure 5C:
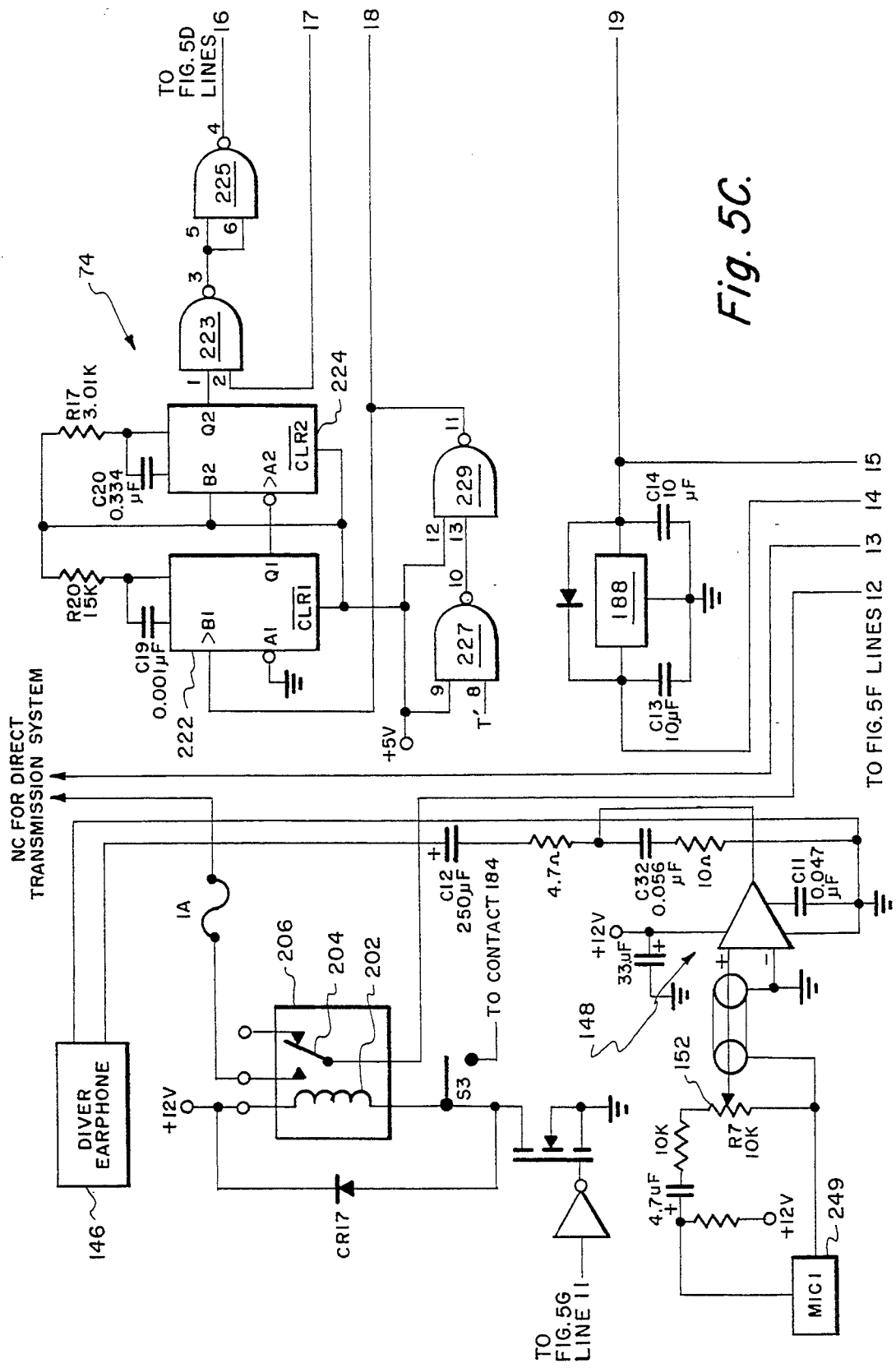
Figure 5G:
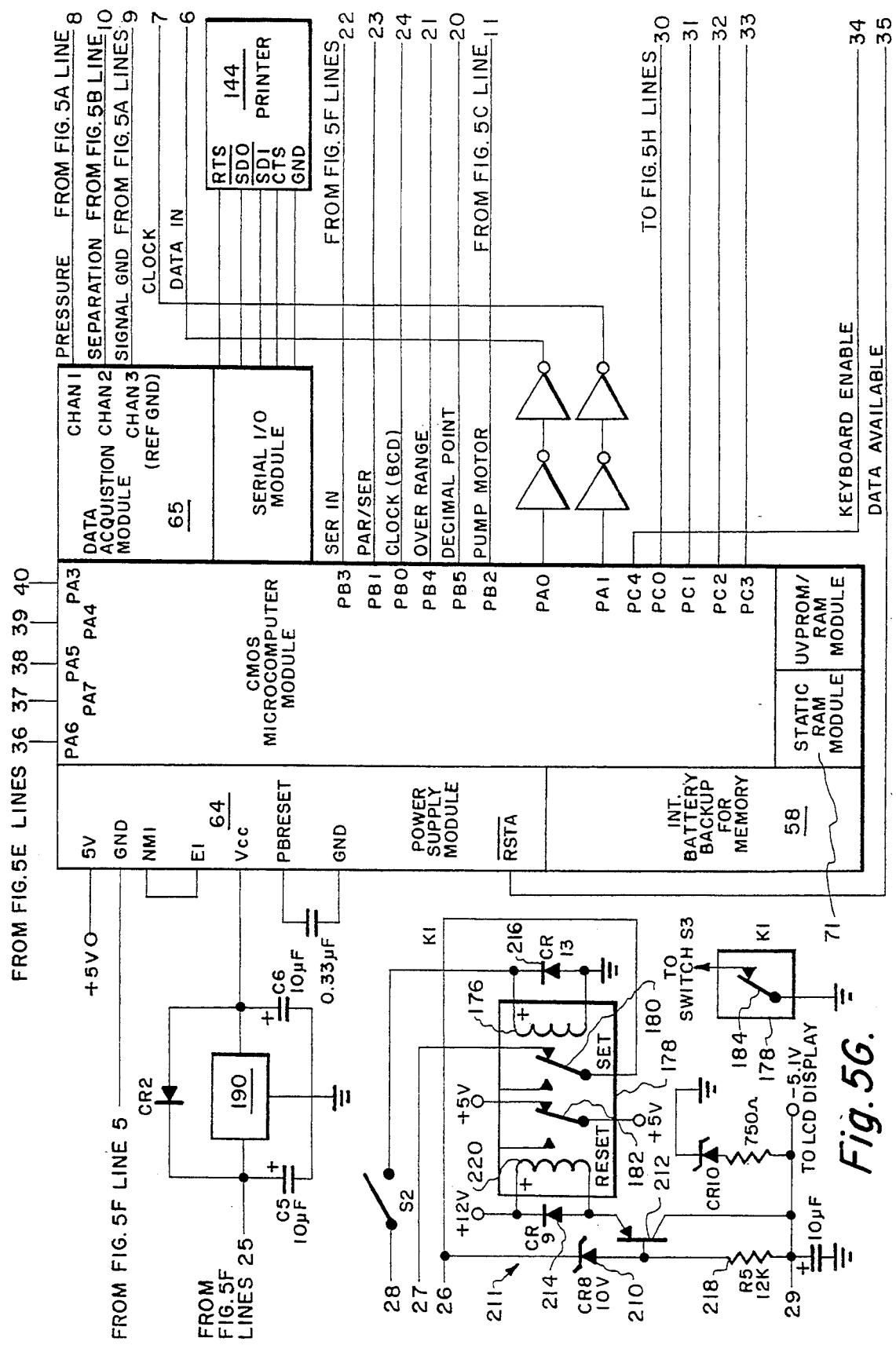

When direct transmission system 40 is utilizing battery 168 as the only source of power for the electrical components of the direct transmission system 40, closure of a momentary contact switch S2 by the operator energizes a coil 176 within relay 178 (relay 124 in FIGS. 3 and 4) which closes contacts 180, 182, 184 and 186 as shown in FIG. 5F and 5G. It should be noted that prior to closing momentary contact switch S2, the operator must first close switch S1 to allow for the energization of coil 176 of relay 178.

Energizing coil 176 of relay 178 connects battery 168 directly to voltage regulators 188, 190, 192, 194 and 196 as well as a DC to DC converter 198. Voltage regulator 196 is connected directly to a DC to DC voltage converter 197. When coil 176 is energized voltage regulators 188, 190, 192, 194 and 196 respectively provide at their outputs +12 VDC, +15 VDC, +12 VDC, +5 VDC and +5VDC which is then supplied to the electrical components of the ship board and underwater electrical components of the direct transmission system 40. Voltage converter 197, in turn, converts the +8VDC at its input to about −6.8 VDC which is provided at its output.

At this time it should noted that the energization of coil 176 of relay 178 allows battery 168 to energize DC to DC converter 198. DC to DC converter 198, which functions as a charger circuit, provides an output of approximately +15VDC at about 200 mA to a pump battery 200. Pump battery 200 (pump battery 134 in FIGS. 3 and 4) is then utilized in the indirect transmission system 42, FIG. 4, to energize suction pump 160, FIG. 4, that is used to actuate suction cups (not shown) that are used to attach the transmit transducer 50 and the receive transducer 52 to a planar surface, such as the surface 34 shown in FIG. 2. It should further be noted that closure of $3 and closure of contact 184 within relay 178 energizes a coil 202 within a relay 206 (relay 100 in FIGS. 3 and 4) thereby closing a contact 204 within relay 206. This energizes suction pump motor 160, FIG. 4.

In a similar manner, when power supply 166 is the source of power for the electrical components of direct transmission system 40 closure of switch $1 supplies power supply 166 with 120 VAC from receptacle 162. Power supply 166 then provides approximately 24 VDC and about a 1.2 amp maximum current via diode 204 to voltage regulators 188, 190, 192, 194 and 196 as well as a DC to DC converter 198.

When the current drain on battery 168 results in a voltage of approximately 15 volts at the positive terminal of battery 168 a sensing circuit 211 (battery latch out circuit 126 in FIGS. 3 and 4) comprising a twelve volt zener diode 210, transistor 212, and a twelve Kohm resistor 218 activates a coil 220 of relay 178 opening contacts 180, 182, 184 and 186 of relay 178 to a reset position which disconnects battery 168 from the electrical components of the direct transmission system 40. This sensing circuit 211 in combination with relay 178 protects battery 168 against over-discharge by isolating battery 168 from the electrical components of the direct transmission system 40. It should be noted that diodes 214 and 216 are protective diodes preventing back EMF when coils 220 and 176 are deenergized.

When battery 168 is fully charged to approximately 22 VDC, zener diode 210 maintains the base voltage of transistor 212 at a voltage level which is sufficient to restrict current flow from the emitter to the collector of transistor 212 and thereby maintain coil 220 in a nonenergized state. As battery 168 discharges the base voltage for transistor 212 decreases, the current flow through coil 220 increases and the base current for transistor 212 increases. When battery 168 discharges to approximately 15 VDC, the emitter to base voltage of transistor 212 will be at 0.6VDC turning on transistor 212 allowing sufficient current flow through coil 220 to energize coil 220. The energizing of coil 220 opens contacts 180, 182, 184 and 186 of relay 178 thereby disconnecting battery 168 from the electrical components of direct transmission system 40.

It should be noted that power supply module 64 of microcomputer 58 supplies a+5VDC to contact 182 of relay 178. When coil 176 of relay 178 is energized contact 182 is in the position illustrated in FIG. 5G such that the +5VDC provided by microcomputer 58 is supplied to NAND gates 227 and 229, flip-flops 222 and 224, a D flip-flop 240, decoder 69, a liquid crystal display 246, and a serial to parallel data converter 248.

Figure 6:
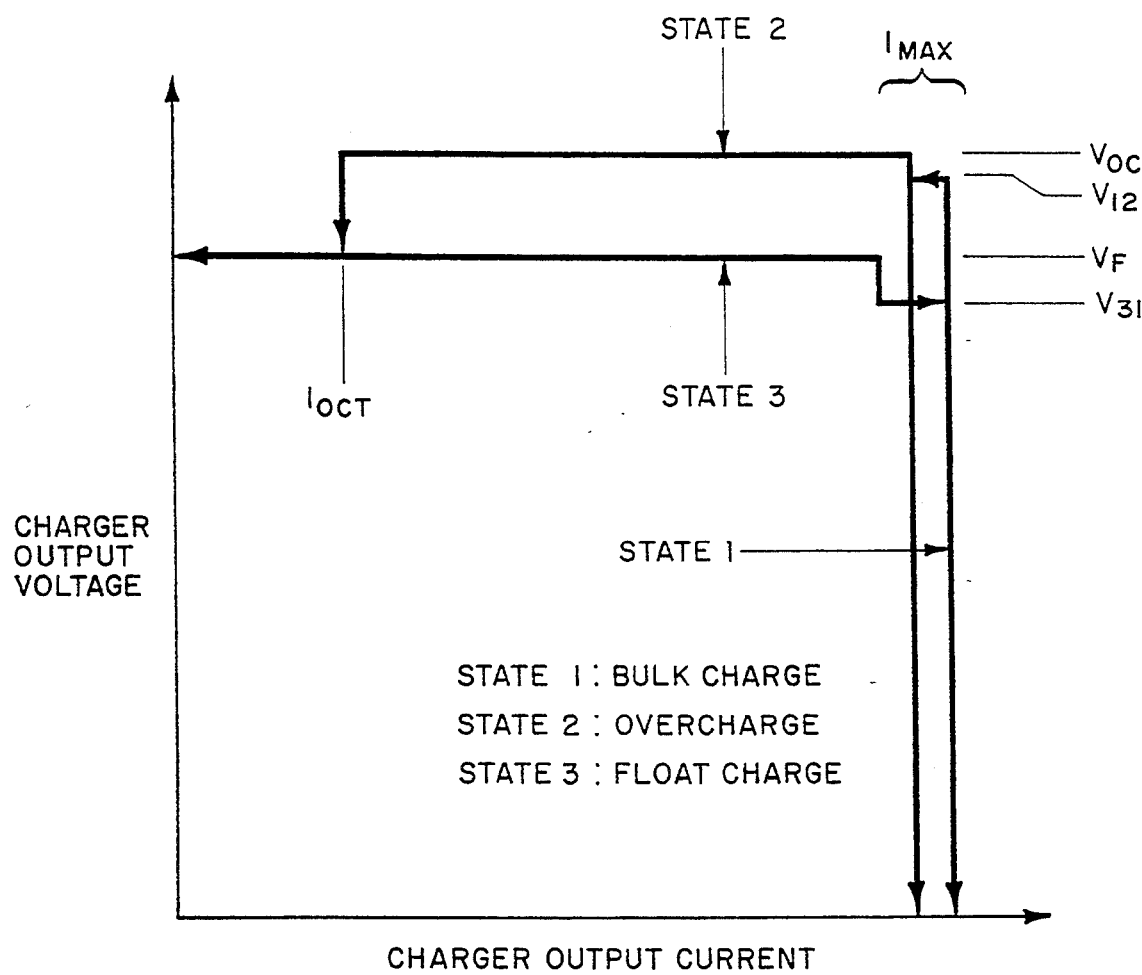
FIG. 6 is a graph illustrating the three charge states of the battery charger of the present invention.

Referring to FIGS. 5F and 6, direct transmission system 40 also includes a battery charger 174 (battery charger 118 in FIGS. 3 and 4) which is used to recharge battery 168 when power supply 166 is being utilized by direct transmission system 40. A charge cycle begins with charger 174 in a bulk charge state (state 1) and charger 174 functioning as a constant current source that provides a constant current of $I_{MAX}$ to battery 168 which is defined by the following equation $$I_{MAX} = \frac{0.25 \text{ V}}{R_S} \tag{1}$$

where $R_S$ is 0.33 ohms. Either of two conditions, in turn, initiates the bulk-charge state at the beginning of the cycle. The first condition occurs when an operator connects receptacle 162 to 120 VAC and the second condition occurs while battery charger 174 is in the float state, that is battery charger 174 senses a low voltage on battery 168. This constant current bulk charge state returns seventy to ninety percent of the charge capacity of battery 168.

Battery charger 174 senses the battery voltage for battery 168. When the voltage reaches a transition threshold voltage $V_{12}$, charger 174 begins an overcharge cycle (state 2). $V_{12}$ is defined by the following equation $$V_{12} = 0.95 V_{OC} \tag{2}$$

where $V_{OC}$ is 22.2 VDC and is defined as the overcharge voltage. The overcharge voltage $V_{OC}$ may be calculated by using the following equation $$V_{OC} = V_{REF}\left(1 + \frac{R_A}{R_B} + \frac{R_A}{R_X}\right) \tag{3}$$

where $R_X$ is defined by the following equation $$R_X = \frac{R_B R_C}{R_B + R_C} \tag{4}$$

and $R_A = R_{A1} + R_{A2}$, $R_B$ is 4.7 Kohms and $R_C$ is 49.9 Kohms. $R_A$ is, in turn, determined by adjusting ten kohm variable resistor $R_{A1}$ such that the overcharge voltage is set at 22.2 VDC. The overcharge voltage is, in turn, measured at the positive terminal of battery 168.

During the overcharge state, charger 174 regulates battery 168 at $V_{OC}$ until the charge rate drops to a specified transition current $I_{OCT}$ which is defined by the following equation $$I_{OCT} = \frac{0.025 \text{ V}}{R_S} \tag{5}$$

where $R_S$ is 0.33 ohm.

When the current provided by battery charger 174 tapers to $I_{OCT}$ with the battery's 168 voltage at $V_{OC}$ the capacity of battery 168 is nearly one hundred percent. At this point, battery charger 168 functions as a voltage regulator with a precise output defined by the following equation $$V_F = V_{REF}\left(1 + \frac{R_A}{R_S}\right) \tag{4}$$

where $R_A = R_{A1} + R_{A2}$, $R_S$ is 0.33 ohm and $V_{REF}$ is a reference voltage for battery charger 168 which is temperature dependent and is typically between 2.425 VDC and 2.18 VDC for a temperature range of zero to seventy degrees celsius.

The output voltage of battery charger 168 is now in the third state $V_F$, that is the float state. If the charge current increases sufficiently to reach $I_{MAX}$ while in float state $V_F$ then $V_{31}$ is reached which leads to the state 1 bulk charge condition after $I_{MAX}$ is reached.

$V_{31}$ is, in turn defined by the following equation $$V_{31} = 0.9 V_F \tag{7}$$

At this time it should be noted that a complete written description of the operation of the battery charger circuit used in the present invention is provided in an article entitled "IC Provides Optimal Lead-Acid-Battery Charger Cycles" by Richard Valley published in Engineering Design News, Oct. 31, 1985, pages 161–178, which is incorporated by reference. It should also be noted that the constant current bulk charge first returns seventy to ninety percent of battery capacity and the remaining charge capacity is returned during the elevated constant voltage overcharge. In addition, it should be noted that external resistors $R_{A1}$, $R_{A2}$, $R_B$, $R_C$ and $R_S$ determine the programming of all battery charger's 174 voltage and current levels which are set forth in equations one through seven.

The float charge state is sensed by a comparator 175 which activates a light emitting diode 177 to indicate battery 168 is fully charged. The battery charger used in the preferred embodiment of the present invention is a Unitrode Model UC3906 battery charger integrated circuit.

It should also be noted that a light emitting diode 179 is connected to the output of voltage regulator 188 to indicate that either switching power supply 166 or battery 168 is operational and thereby supplying current to the electrical components of the direct transmission system 40. It should also be noted that contact 184 of relay 178 must be closed before light emitting diode 179 is activated.

Direct transmission system 40 also includes a light emitting diode 181 which indicates the battery charger 174 is on and which requires the closure of contact 184 of relay 178 to be operational.

Referring to FIGS. 5A and 5B, ultrasonic transmitter 72 sends high voltage pulses to transmit transducer 50. The high voltage pulse may be about 1000 volts. The high voltage pulse from the ultrasonic transmitter 72 causes the transmit transducer 50 to produce an ultrasonic pulse. The high voltage pulse from the transmitter 72 also produces an appreciable amount of electromagnetic interference. A concrete piling (not shown) or like structure will be positioned between the transmit transducer 50 and the receive transducer 52. Ultrasonic pulses pass through the concrete structure and impinge on the receive transducer 52.

The output of the receive transducer 52 is then input to preamp 82, which provides an amplified signal to an ultrasonic amplifier 221, which is shown in FIG. 5D. The output of the ultrasonic amplifier 221 is then input to blanking circuit 74 shown in FIG. 5C. The blanking circuit 74 includes a monostable multivibrator 222, a monostable multivibrator 224, a NAND gate 223 and a NAND gate 225, a NAND gate 227 and a NAND gate 229.

At this time it should be noted that flip-flops 222 and 224 are National Semiconductor Model MM74C221 Dual Monostable multivibrators and NAND gates 223, 225, 227 and 229 are RCA Model CD4093B Qaud 2-Input NAND Schmitt Triggers. The flip-flops 222 and 224 are connected to function as monostable multivibrators. The monostable multivibrator 222 is arranged so that when the input B1 receives a pulse, output Q1 of multivibrator 222 outputs a 15 microsecond positive going pulse. The NAND gates 223, 225, 227 and 229 are connected to function as Schmitt trigger circuits.

Simultaneously with outputting each high voltage pulse through the concrete structure under test, ultrasonic transmitter 72 outputs a logic pulse T' at its T output that is input to pin 8 of NAND gate 227. Pin 9 of the NAND gate 227 is connected to the CLR inputs of multivibrators 222 and 224 which, in turn, receive +5VDC from the power supply module 64 of microcomputer 58 via contact 182 of relay 178. The logic pulse T' when input to NAND gate 227 causes the output of NAND gate 227 to provide a negative going pulse, that is a logic zero pulse. This logic zero pulse is inverted by NAND gate 229 and is then supplied to the T input of V-meter electronics module 76, FIG. 5D, and the B1 input of multivibrator 222.

It should be noted that the logic pulse T' provided by transmitter 72 is a voltage spike and that NAND gates 227 and 229 are used to convert the logic pulse T' to a square wave pulse.

The logic zero to one transition of the pulse occurring at the output of NAND gate 229 triggers multivibrator 222. The Q1 output of multivibrator 222 is connected to the A2 input of multivibrator 224, which results in multivibrator 222 providing a 15 microsecond positive going pulse to the A2 input of multivibrator 224.

The logic one to zero transition of the 15 microsecond positive going pulse triggers multivibrator 224 which provides a one millisecond positive going pulse to pin 1 of NAND gate 223. Pin 2 of NAND gate 223 is connected to the output of ultrasonic amplifier 201 to receive the signal output of the receiver 52 after amplification by preamp 82 and amplifier 201. The one millisecond pulse input to NAND gate 223 allows the output of the ultrasonic amplifier to pass to NAND gate 225.

The one millisecond pulse input to pin 1 of NAND gate 223 acts as a window. If the output of ultrasonic amplifier 221 reaches NAND gate 223 during the one millisecond window, then the output of the ultrasonic amplifier 221 will pass to NAND gate 225. NAND gate 225 inverts the pulse provided by NAND gate 223 and then inputs it to the ultrasonic V-meter electronics module 76. James Instruments, Inc. Model C-4901 may be used as the ultrasonic V-meter electronics module 76. The ultrasonic V-meter electronics module 76 has a T input that is connected to the output of the NAND gate 229. When the square wave pulse from NAND gate 229 is supplied to the ultrasonic V-meter electronics module 76, counting circuitry within module 76 (not shown) is activated.

The leading edge of the pulse from NAND gate 225 when supplied to ultrasonic V-meter electronics module 76 turns off the counting circuitry within module 76, holding the count between the pulse to the T input of module 76 and the pulse received from NAND gate 225. The blanking circuit 74 is desirable because it is undesirable for the ultrasonic V-meter electronics module 76 to respond immediately after the pulse from NAND gate 229 is received. A finite time is required for the ultrasonic signal to travel through the concrete and reach the receiver transducer 52. Additional time is required for the electrical signal from the receiver transducer 52 to pass through the circuitry of direct transmission system 40 to the ultrasonic V-meter electronics module 76. Without the blanking circuit 74 there is a problem with cross talk between the 1000 volt pulse output from the ultrasonic transmitter 72 and the receive line that connects the preamplifier 82 and the ultrasonic amplifier 221.

The V-meter electronics module contains circuitry including the counting circuitry for computing the transit time of the ultrasonic wave through the concrete structure under test. The transit time for the ultrasonic wave through the concrete structure under test is displayed by four digit display 80, illustrated in FIGS. 3 and 4. The transit time is also provided from BCD output 86 through parallel to serial converter 88 to microcomputer 58 through its PB3 input. It should be noted that the parallel to serial converter 88 comprises a pair of parallel to serial converters 250 and 252.

The separation distance transducer 54 output signal is input to an amplifier 243 and then input to a data acquisition module 65 of the microcomputer 58. The microcomputer 58 then calculates the velocity of the ultrasonic waves in the concrete by dividing the distance the waves travel in the concrete structure under test by the time interval required to traverse the distance.

Referring to FIGS. 3, 5G and 5H, keypad 67 is used by the operator to input certain digital data/information into microcomputer 58 such as the number of measurements to be made on a concrete structure under test. When the operator desires to enter data into microcomputer 58 a sixteen key decoder 69 which is electrically coupled to keypad 67 provides a logic zero to one transition at its DA output (data available). This logic zero to one transition clocks the logic one at the D input of Flip-Flop 240 to the Q output thereof which causes the not Q output of Flip-Flop 240 to transition from the logic one to the logic zero state thereby providing an interrupt to the/RSTA input of microcomputer 58. This interrupt provided by Flip-Flop 240 indicates to microcomputer 58 that decoder 69 is ready to provide data to microcomputer 58.

At this time it should be noted that the decoder used in the preferred embodiment of the present invention is a CMOS key encoder, Model MM74C992 16 Key Encoder manufactured by National Semiconductor.

The functions of the keys on keypad 69 are briefly described as follows: L selects the alpha character located in the left hand corner of each alphanumeric key; M selects the alpha character located in the middle of each alphanumeric key and R selects the alpha character located in the right hand corner of each alphanumeric key. DELETE allows deletion of the last entry without affecting other data entered; SELECT allows a cursor to be moved around liquid crystal display 246 to select a desired function and DONE allows data to be entered into the static RAM module 71 of microcomputer 58 or executes the selected function. The alphanumeric keys "0-9, A-Z, +, −, #, SP" allow either numbers or letters to be entered microcomputer 58 via decoder 69. Numbers are selected by pressing the desired key, while letters are entered by pressing a position key (either L, M or R) and the key with the desired letter on it. A blank space is generated by selecting the SP key.

The liquid crystal display 246 used in the preferred embodiment of the present invention is a 4 line by 40 character LCD display Model LM44A4C40CBW LCD manufactured by Densitron. Data provided by microcomputer 58 for display by liquid crystal display 246 is provided to a serial to parallel data converter 248 which converts the data from an eight bit serial word to an eight bit parallel word and then supplies each eight bit parallel word to liquid crystal display 246 for display thereby.

Direct transmission system 40 also has a diver communications circuit which includes a microphone jack 249, FIG. 5C, adapted to receive microphone 150, FIGS. 3 and 4, diver earphone volume control 152 connected to jack 249, audio amplifier 148 connected to jack 249 and diver earphone 146 connected to the output of the amplifier 148. The diver communications circuit allows for ship or shore to diver communication with the diver using direct transmission system 40 to test an underwater concrete structure for deterioration.

A program listing is attached to this disclosure as an Appendix A. The program listing is an example of software that may be used with the apparatus shown in FIGS. 3, 4 and 5A–5H.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

Appendix A:

```
C****************************************************************
C                                                                *
C       ULTRASONIC SCANNER - math routines and some logic parts  *
C                                                                *
C                                                                *
C****************************************************************
C
        SUBROUTINE y
CALCS
        BYTE      ATYPE,DPFLG,ORFLG,RTGNUM
        INTEGER   NCAL,CALCJB,SVEL,MTT,LENGTH,IDEPTH
        REAL      LENRDG
C
        COMMON/VAR/ATYPE,DPFLG,ORFLG,RTGNUM,NCAL,CALCJB,SVEL,MTT,
     1  LENGTH,IDEPTH,ADCH(8)
C
        GOTO(10,20),CALCJB
10      LENRDG=(ADCH(2)+0.84)*5.556
        DEPRDG=(ADCH(1)-2.47)*22.5
        IF(ADCH(2).GT.0.5)GOTO 102
        ATYPE='I'
        LENRDG=12.
        GOTO 104
102     ATYPE='D'
104     IDEPTH=IFIX(DEPRDG)
        IDEPTH=IABS(IDEPTH)
        LENGTH=IFIX(LENRDG)
        LENGTH=IABS(LENGTH)
        IF (DPFLG.EQ.1)MTT=MTT/10
        RETURN
C
20      IF (MTT.GT.9) GOTO 202
        RTGNUM=100
```

```
           RETURN
202    MTT=MTT-9
       TT=FLOAT(MTT)
       VEL=LENRDG*83333./TT
       IF(VEL.GT.64000.)VEL=64000.
       SVEL=IFIX(VEL)
C
       RTGNUM=0
       IF (VEL.LT.15000.)GOTO 21
       RETURN
C
21     RTGNUM=1
       IF (VEL.LT.12000.)GOTO 22
       RETURN
C
22     RTGNUM=2
       IF (VEL.LT.10000.)GOTO 23
       RETURN
C
23     RTGNUM=3
       IF (VEL.LT.7000.)   GOTO 24
       RETURN
C
24     RTGNUM=4
       RETURN
C
       END

TITLE UTIL.MAC
;
;******************************************************************
;
;
;      This module handles LCD drivers and various utilities
;      for the system.
;
;      ULTRASONIC    - instrument to measure concrete condition
;                      underwater.
;
;      Author: Roman VSEVOLOD Kruchowy                Date:  JUN 03 1987
;
;
  .XLIST
;.LIST
   PAGE
  .SALL
;
;
;
;POINTERS
;
PCDDR    EQU     06H          ;PORTC DATA DIRECTION REGISTER
PCIO     EQU     02H          ;port C I/O
PCBC     EQU     0AH          ;port C clear, write only
PCBS     EQU     0EH          ;port C set,write only
;
PBDDR    EQU     05H          ;PORTB DATA DIRECTION REGISTER
PBIO     EQU     01H          ;PORTB I/O REG
PBBC     EQU     09H          ;PORTB CLEAR WRITE ONLY
PBBS     EQU     0DH          ;PORTB SET WRITE ONLY REG
```

```
;
    PADDR   EQU     04H         ;PORTA DATA DIRECTION REG
    PAIO    EQU     00H         ;PORTA I/O REG
    PABC    EQU     08H         ;PORTA CLEAR REG
;
    PABS    EQU     0CH         ;PORTA SET WRITE ONLY REG
    PAMDR   EQU     07H         ;MODE DEF REG PORTA
    T0CMR   EQU     018H        ;TIMER 0 COMMAND REG
    T0LSB   EQU     010H        ;TIMER 0 LSB
    T0MSB   EQU     011H        ;  "     "  MSB
    T0STP   EQU     014H        ;  "     "  STOP REG
    T0STRT  EQU     015H        ;  "     "  START REG
    T1CMR   EQU     019H        ;TIMER 1 COMMAND REG
    T1LSB   EQU     012H        ;TIMER 1 LSB
    T1MSB   EQU     013H        ;  "     "  MSB
    T1STP   EQU     016H        ;  "     "  STOP REG
    T1STRT  EQU     017H        ;  "     "  START REG
;
    STACK   EQU     07FFFH      ;STACK BEGIN HERE
    RAMTOP  EQU     07000H
    ONE     EQU     0001H
;
    T0MODE  EQU     039H        ;PRESCALE =64,SINGLE READ,MODE 1
    T1MODE  EQU     0A5H        ;PRESCALE =01,SINGLE READ,MODE 6
    MODU1   EQU     28          ;COUNT MODULUS FOR F1 WITH 2.0 MHZ IN
    MODU2   EQU     34          ;COUNT MODULUS FOR FREQ F2 WITH 2.0 MHZ IN
    SEC.2   EQU     65522       ;counts per 2 sec @ 2mhz/64
    MODU0   EQU     SEC.2-1     ;TIMER 0 MODULUS(2SEC)
    SEC.1   EQU     32761-5     ;SEC.2/2 -5   1 sec delay
;
    NRSTA   EQU     08          ;ICRB bit position for RSTA interrupt
    NRSTB   EQU     04          ;  "    "    "      "  RSTB    "
    NRSTC   EQU     02          ;  "    "    "      "  RSTC    "
    NINTR   EQU     01          ;  "    "    "      "  INTR    "
    NALL    EQU     0FH         ;ALL interrupts enabled
;
;
    PAGE
SETA    MACRO   N
        LD A,01 SHL N           ;SETS PORT A BIT N
        OUT (PABS),A
        ENDM
;
CLRA    MACRO   N
        LD A,01 SHL N           ;CLEARS PORT A BIT N
        OUT (PABC),A
        ENDM
;
APULSE  MACRO N                 ;GENERATES A PULSE ON PORT A,BIT N
        LD A,01 SHL N           ;..1...0
        OUT (PABS),A
        OUT (PABC),A
        ENDM
;
SETB    MACRO   N
        LD A,01 SHL N           ;SETS PORT B BIT N
        OUT (PBBS),A
        ENDM
;
CLRB    MACRO   N
        LD A,01 SHL N           ;CLEARS PORT B BIT N
        OUT (PBBC),A
```

```
        ENDM
;
BPULSE  MACRO   N                       ;generates pulse on port B bit N
        LD A,01 SHL N
        OUT (PBBS),A
        OUT (PBBC),A
        ENDM
;
;
CPULSE  MACRO   N                       ;generates pulse on port C bit N
        LD A,01 SHL N
        OUT (PCBS),A
        OUT (PCBC),A
        ENDM
;
READA   MACRO   N                       ;READ PORT A BIT N
        IN A,(PAIO)
        BIT N,A
        ENDM
;
ENAICR  MACRO   N                       ;enables interupts via ICRB
        LD A,N
        OUT (0BBH),A
        ENDM
;
;.XLIST
 .LIST
  PAGE
;
        ENTRY   $EX,$ERR
;
        EXT     VDBTBL,MNUTBL,KEYTBL,KELTBL,KEMTBL,KERTBL,VDBREQ
;
        EXT     RAMDISP,DISPTR,MNUPTR,VDBPTR,KEYPTR,LINPTR,COLPTR
        EXT     VARPTR,CHRMAX,CHRCNT,CHRNUM,CHRIN,CHRFLG,MNUNUM,VDBNUM
        EXT     NCAL,NUM0,NUM1,NUMD0,NUMD1,NUMD2
        EXT     ASCLEN,ASCPTR,ASCBUF,ASCEND,M24RAM
        EXT     ADBUF,PKFLG
        EXT     DISBUF,SYMB,DMSG1,NUMCOD,DPFLG,ORFLG,PR$TBL,PR$PTR
;
        PUBLIC  LCDINI,MOVRAM,MOVDIS,MOVVDB,POSCUR,CURON,MULT,PNTVDB
        PUBLIC  LINOUT,BCD2B,MNUPNT
        PUBLIC  CHRDEL,CHROUT,MNUSET,MNUIN,INCVDB,VDBSET
        PUBLIC  BCD2SI,D2LCD,DISOUT
        PUBLIC  ADTSK
;
        DELETE  EQU     01              ;keypad codes for special keys
        SELECT  EQU     05              ;SELECT key code
        DONE    EQU     06              ;DONE key code
;
;
;
;*********** UART interrupt **************************
;
        ASEG
        ORG     02CH                    ;RST C interrupt
        PUBLIC  UART
UART:   JP RSTC
;
;
;****************************************************************
*
```

```
;
;       Keypad interrupt processing
;
        ORG     034H                    ;RSTB
KEYINT: JP      RSTB
;
;
;**********      POWER FAIL     *************************************
;
        ORG     03CH                    ;RSTA
PWRFAL: HALT
        JP      PWRFAL
;
;
;******************** KEY PAD interrupt ********************
;
;
RSTB:   PUSH    AF                      ;save regs
        PUSH    DE
        PUSH    HL
        IN      A,(PCIO)                ;get coded binary input from keypad
        AND     0FH                     ;use only lower 4 bits
        LD      D,00                    ;initialize MSB of reg DE
        LD      E,A                     ;save binary input as index to key table
        LD      HL,(KEYPTR)             ;get currently active keypad table
        ADD     HL,DE                   ;generate pointer to coded character
        LD      A,(HL)                  ;get the character
;
        CP      00H                     ;if character is null than unacceptable input
        JP      NZ,KEYL                 ;if something else than check if 'shift' char.
        LD      HL,KEYTBL               ;else reinitialize key table pointer
        LD      (KEYPTR),HL
        JP      KEYEXT                  ;and exit
;
KEYL:   CP      04                      ;check if 'shift' left character table
        JP      NZ,KEYM
        LD      HL,KELTBL               ;if sopoint to left table for char input
        LD      (KEYPTR),HL
        JP      KEYEXT
;
KEYM:   CP      03                      ;check if 'shift' middle character table
        JP      NZ,KEYR
        LD      HL,KEMTBL               ;if so them point to middle table
        LD      (KEYPTR),HL
        JP      KEYEXT
;
KEYR:   CP      02                      ;check if 'shift' right is desired
        JP      NZ,REGCHR               ;if not must be a regular character
        LD      HL,KERTBL               ;else use shift right table in pointer.
        LD      (KEYPTR),HL
        JP      KEYEXT
;
REGCHR: LD      (CHRIN),A               ;and store in character input buffer
        LD      A,01                    ;set flag character has arrived
        LD      (CHRFLG),A
        LD      HL,KEYTBL               ;reset table to un-'shifted'
        LD      (KEYPTR),HL
```

```
;
KEYEXT: CPULSE  04H                     ;pulse interrupt reset line
        POP     HL                      ;restore regs used.
        POP     DE
        POP     AF
        EI                              ;enable interrupts
        RET
;
;
;
;
;*********** UART INTERRUPT PROCESSING
;
;
;
        UBASE   EQU     0C0H
        USTAT   EQU     03H+UBASE
        NRXD    EQU     01H+UBASE
        NTXD    EQU     00H+UBASE
;
        EXT     USTORE,UOCNT,UOBPTR,UICNT
;
RSTC:   PUSH    AF                      ;save regs
        PUSH    HL
        IN      A,(USTAT)               ;status byte in accum
        LD      (USTORE),A
        BIT     0,A                     ;bit 0,set?
        JP      Z,XMITIN                ;if not must be transmit intrupt
        IN      A,(NRXD)                ;else serial data in and
        LD      (UICNT),A               ;store character to signal arrival
;
XMITIN: LD      A,(USTORE)              ;get stores status byte
        BIT     7,A                     ;check if transmit reg is empty
        JP      Z,UEXIT                 ;if not than exit
        LD      A,(UOCNT)               ;else check character count
        AND     A                       ;set flags
        JP      Z,UEXIT                 ;if empty than exit
        LD      HL,(UOBPTR)             ;get pointer to output buffer
        LD      A,(HL)                  ;get next character
        OUT     (NTXD),A                ;send out
        BIT     7,A                     ;check if last character in string
        JP      Z,UCONT                 ;if not set to a 1 skip
        XOR     A                       ;else reached last character
        LD      (UOCNT),A               ;notify by set count to a zero.
UCONT:  INC     HL                      ;increment pointer to next chracter
        LD      (UOBPTR),HL             ;and save in pointer
UEXIT:  POP     HL                      ;restore regs
        POP     AF
        EI                              ;enable intupts and return
        RET
;
;
;
;****************************************************************
;
;       Cursor turn on to the appropriate display
;
```

```
        CSEG
;
CURON:  LD      A,(LINPTR)          ;determne active line number
        PUSH    AF                  ;save current active line number
        BIT     01,A                ;if 2 or 3 then display 2 active
        JP      NZ,CURD2            ; jump to display 2 active routine.
CURD1:  LD      A,02                ;else,display 1 active and
        LD      (LINPTR),A          ;            send first command to
        LD      D,LCDONF            ;display 2 to turnoff cursor
        CALL    LCDCMD
        LD      A,01
        LD      (LINPTR),A          ;and turn on cursor in display 1
        LD      D,LCDON
        CALL    LCDCMD
        JP      CUREXT
;
CURD2:  LD      A,01                ;display 2 active.
        LD      (LINPTR),A          ;else, turn off display 1 cursor
        LD      D,LCDONF            ;via command
        CALL    LCDCMD
        LD      A,02
        LD      (LINPTR),A          ;and turn on display two cursor.
        LD      D,LCDON
        CALL    LCDCMD
;
CUREXT: POP     AF                  ;get original active line number
        LD      (LINPTR),A          ;and restore.
        RET
;
;
;
;****************************************************************
;
;       Move Menu N to RAM MAP
;
MOVRAM: LD      DE,(MNUNUM)         ;get index to active menu
        SLA     E                   ;multiply by 2,('cause words not bytes)
        LD      HL,MNUTBL           ;go to start of table addresss
        ADD     HL,DE               ;generate index to table
        LD      E,(HL)              ;get LSB of address
        INC     HL
        LD      D,(HL)              ;and the MSB of address to menu.
        EX      DE,HL               ;store in HL
        LD      (MNUPTR),HL         ;          and in pointer.
        LD      DE,RAMDISP          ;load destination address
        LD      BC,160              ;character count
        LDIR                        ;and do block transfer.
        RET
;
;
;****************************************************************
;
```

```
;       Move Menu N to Display
;
MOVDIS: LD      A,00                    ;set output to display line 0
        LD      (LINPTR),A              ;in line pointer
        LD      (COLPTR),A              ;start from column 0
        LD      A,40                    ;and 40 characters
        LD      (CHRNUM),A
;
        LD      HL,RAMDISP
        LD      (DISPTR),HL
        CALL    LINOUT
;
        LD      A,01                    ;set up line number
        LD      (LINPTR),A              ;store in line pointer
        LD      HL,RAMDISP+40           ;beginning of line memory
        LD      (DISPTR),HL             ;store in pointer
        CALL    LINOUT                  ;send out the line
;
        LD      A,02                    ;set up line number
        LD      (LINPTR),A              ;store in line pointer
        LD      HL,RAMDISP+80           ;beginning of line memory
        LD      (DISPTR),HL             ;store in pointer
        CALL    LINOUT                  ;send out the line
;
        LD      A,03                    ;set up line number
        LD      (LINPTR),A              ;store in line pointer
        LD      HL,RAMDISP+120          ;beginning of line memory
        LD      (DISPTR),HL             ;store in pointer
        CALL    LINOUT                  ;send out the line
;
        RET
;
;
;****************************************************************
;
;       Outputs to LCD display as specified by line pointer(LINPTR)
;       starting in column (COLPTR) and for number of
characters(CHRNUM).
;       Xfers characters to LCD from memory location given by DISPTR.
;
LINOUT:
        LD      A,(LINPTR)              ;get currently active line
pointer
        AND     03H                     ;strip off type of var(numeric
or alpha)
        RRCA                            ;rotate right into bit 7
        RRCA                            ;rotate right into bit 6
        OR      80H                     ;set up as DD RAM command to
line0
        LD      D,A                     ;or line 1
        LD      A,(COLPTR)              ;get column number
        OR      D                       ;or the two to set DDram
adress
        LD      D,A
        CALL    LCDCMD                  ;send out command
        LD      A,(CHRNUM)              ;set up character couunt
        LD      C,A
        LD      HL,(DISPTR)             ;get pointer at current
character
        CALL    LCDRV                   ;and send out char.
        RET
;
;
```

```
;
;
;*****************************************************************
;
;        Move CURSOR to start of currently active variable
;        as determined by column and line pointer.
;
POSCUR: LD      A,(LINPTR)              ;get currently active line
pointer
        AND     03H                     ;strip type variable bit off
        RRCA                            ;rotate right into bit 7
        RRCA                            ;rotate right into bit 6
        OR      80H                     ;set up as DD RAM command to
line0
        LD      D,A                     ;or line 1
        LD      A,(COLPTR)              ;get column number
        OR      D                       ;or the two to set DDram
adress
        LD      D,A
        CALL    LCDCMD                  ;send out command
        LD      C,1                     ;set up character couunt
        LD      HL,(DISPTR)             ;get pointer at current
character
        CALL    LCDRV                   ;and send out char.
        LD      D,LCSHFL                ;and shift cursor back to left
        CALL    LCDCMD
        RET
;
;
;
;*****************************************************************
;
;
PNTVDB: LD      HL,VDBNUM               ;else increment index
        INC     (HL)
        CALL    VDBSET                  ;get VDB and move it into currently
active block
        JP      NC,PNTVDB               ;reach end? if so get first VDB
;
        LD      A,(MNUNUM)              ;get menu index
        AND     A
        JP      NZ,VDBINP               ;are we doing menu 0,if not do regular
process
        LD      A,(VDBREQ)              ;if so get former position in that
menuu
        DEC     A                       ;decrement it
        LD      (VDBNUM),A              ;and put it in the variable definition
index
VDBINP: LD      HL,VDBNUM               ;     increment index
        INC     (HL)
        CALL    VDBSET                  ;else get VDB
        LD      A,(LINPTR)              ;is it a input variable?
        AND     40H                     ;check bit 6,if set only valid for
output
        JP      NZ,VDBINP               ;if NOT set than exit
        RET                             ;else, return.
;
;
;*****************************************************************
;
;
MOVVDB: LD      HL,VDBNUM               ;else increment index
        INC     (HL)
        CALL    VDBSET                  ;move in the next VDB info
```

```
        JP      C,MOVVDB            ;if at the end of list,go back to the top
        LD      A,(LINPTR)          ;else check if a input variable or output only
        AND     40H                 ;chevk bit 6
        JP      NZ,MOVVDB           ;if set get next VDB
        RET                         ;else,return
;
;****************************************************************
;
;       Move Varaible definition block to RAM,i.e.
;       moves line,col,character count to RAM and generates pointer to
;       position in RAM display for first input.
;
VDBSET: LD      DE,(MNUNUM)         ;point to current active menu index and
        SLA     E                   ;X2 'cause table made up of word adres
        LD      HL,VDBTBL           ;associated  variable block table
        ADD     HL,DE               ;add index to table address
        LD      E,(HL)              ;pointing to indirect addresss
        INC     HL                  ;get address of beginning of VDB
        LD      D,(HL)
        EX      DE,HL               ;and puut in HL rgister
;
        LD      A,(VDBNUM)          ;find current active variable
        LD      C,A                 ;index by five   to the right place
        LD      D,05
        CALL    MULT                ;by uusing multiply routine
        ADD     HL,BC               ;add to beginning of table address
;
        LD      A,(HL)              ;and get line location of variable
        AND     A                   ;set flags
        JP      NZ,GETVDB           ;    zero?
        DEC     A
        LD      (VDBNUM),A          ;if so end of variables;reset variable
        SCF                         ;set flag to indicate end of VDB
        RET                         ;and return
;
GETVDB: DEC     A                   ;make line number 0-3
        LD      (LINPTR),A          ;put it into the RAM line ptr
        AND     03H                 ;strip off junk and leave line number
        LD      C,A                 ;generate offset to RAM display
        LD      D,40                ;by multiplying by 40.
        CALL    MULT                ;result in BC
;
        INC     HL                  ;point to column position
        LD      A,(HL)              ;get value
        DEC     A                   ;make col number 0-39
        LD      (COLPTR),A          ;store in RAM column pointer
        ADD     A,C                 ;add to RAM display offset
        LD      C,A                 ;and store.
;
```

```
            INC     HL                      ;get character count for
    variable
            LD      A,(HL)                  ;and store in RAM character
    count
            LD      (CHRMAX),A
;
            INC     HL                      ;get address of variable into
    RAM
            LD      E,(HL)                  ;store in regs DE
            INC     HL
            LD      D,(HL)
            LD      (VARPTR),DE             ;than save in active variable
    pointer
;
            XOR     A                       ;initialize character count
            LD      (CHRCNT),A
;
            LD      HL,RAMDISP              ;finally get beginning of RAM
    display
            ADD     HL,BC                   ;add offset to address to
    generate
            LD      (DISPTR),HL             ;pointer to first variable
    entry.
;
            LD      A,(LINPTR)              ;get print out variable index
            RRCA                            ;move to lower 3 bits
            RRCA
            RRCA
            DEC     A                       ;generate index
            AND     07H                     ;mask out all the trash
            SLA     A                       ;*2 to make word index
            LD      D,0                     ;clear out addend
            LD      E,A
            LD      HL,PR$TBL               ;get address of printout table
            ADD     HL,DE                   ;generate indirect address to
    print line
            LD      E,(HL)                  ;get address in table
            INC     HL
            LD      D,(HL)
            LD      (PR$PTR),DE             ;and store in the print
    pointer
;
            LD      A,(LINPTR)              ;get linpointer byte
            AND     A                       ;set flags to check typr of
    variable
            JP      P,VDBALP                ;if bit 7=0 alpha variable,
    and exit
            LD      HL,(VARPTR)             ;else must be numeric,get
    address of
            LD      E,(HL)                  ;get LSB to convert,
            INC     HL                      ;assuume variable INTEGER*2
            LD      D,(HL)                  ;and get MSB,store in DE
            EX      DE,HL                   ;than put in to HL
            CALL    B2ASC                   ;     and convert to ASCII
            LD      B,00                    ;initialize character count
    regs
            LD      A,(CHRMAX)              ;load in chracter count
            LD      C,A
            LD      HL,ASCEND               ;get right justified address,
            AND     A                       ;clear carry and point to
    indexed
            SBC     HL,BC                   ;ASCII output buffer
            LD      DE,(DISPTR)             ;get DEstination address
```

```
        LDIR                            ;and transfer block of
chracters
;
        LD      B,00                    ;initialize character count
regs
        LD      A,(CHRMAX)              ;load in chracter count
        LD      C,A
        LD      HL,ASCEND               ;get right justified address,
        AND     A                       ;clear carry and point to
indexed
        SBC     HL,BC                   ;ASCII output buffer
        LD      DE,(PR$PTR)             ;get DEstination address,to
print line
        LDIR                            ;and transfer block of
chracters
;
        JP      VDBEX
;
VDBALP: LD      HL,(VARPTR)             ;get address of beginning of
variable
        LD      DE,(DISPTR)             ;get destination in RAM
        LD      A,(CHRMAX)              ;number of characters
        LD      C,A                     ;into couunt
        LD      B,00                    ;zero ouut reG B
        LDIR                            ;do block transfer
;
        LD      HL,(VARPTR)             ;get address of beginning of
variable
        LD      DE,(PR$PTR)             ;get destination in RAM,print
line
        LD      A,(CHRMAX)              ;number of characters
        LD      C,A                     ;into couunt
        LD      B,00                    ;zero ouut reG B
        LDIR                            ;do block transfer
;
VDBEX:  LD      A,(CHRMAX)              ;and ship out to the LCD
display
        LD      (CHRNUM),A
        CALL    LINOUT                  ;sends line out to LCD
;
        AND     A                       ;clear flag indiacte done
        RET                             ;and return
;*****************************************************************
;
;
;       LCD initialization routine
;
        LCDFS   EQU     00111000B       ;2 lines,5x7 dots,8 bits data
        LCDMS   EQU     00000110B       ;increment DDRam
address,noshift
        LCDONF  EQU     00001100B       ;LCD display on,cursor off
        LCDON   EQU     00001111B       ;LCD display on,cursor on
        LCDCLR  EQU     01              ;clear display,all spaces
        LCSHFR  EQU     014H            ;shift cursor to right
        LCSHFL  EQU     010H            ;shift cursor to left
;
LCDINI: LD      D,LCDFS                 ;initialize LCD function
        CALL    LCDCMD                  ;send to command output
        LD      D,LCDFS
        CALL    LCDCMD                  ;repeat
        LD      D,LCDMS                 ;st up toincrement address
        CALL    LCDCMD
        LD      D,LCDON                 ;turn display on
```

```
                CALL     LCDCMD
                LD       D,LCDCLR              ;clear to all spaces
                CALL     LCDCMD
                RET
;
;
;****************************************************************
;
;       Liquid Display Driver:
;       Used with DENSITRON dot matrix LCD modules
;       port A outputs:  PA6:  data
;                        PA7:  clock       0>1 xition
;                        PA5:  RS          0:Inst      1:Char  register
;                        PA4:  enable      1>0 xition  display 1
;                        PA3:  enable      1>0 xition  display 2
;       Called with character buffer pointer in HL
;              "       "        "     count in the    C register
;
                LDATA    EQU      06           ;Port A bit 6,data
                LCLK     EQU      07           ;Port A bit 7,clock
                LENA1    EQU      04           ;Port A bit 4,enable pulse
display 1
                LENA2    EQU      03           ;Port A bit 3,enable pulse
display 2
                LRS      EQU      05           ;Port A bit 5,register select
;
                ENTRY    LCDRV
;
LCDRV:          LD       D,(HL)                ;get character
                INC      HL                    ;point to next one
                CALL     LCDOUT                ;ship it out.
                DEC      C                     ;decrement character count
                JP       NZ,LCDRV              ;all done?
                RET                            ;if yes return.
;
;
;                     ******************
;       This routine toggles the RS line to ouput the byte as
;       instruction to the display
;
LCDCMD:   CLRA  LRS                            ;set register select line low
          CALL  LCDOUT                         ;and output code in reg 'D'
          SETA  LRS                            ;reset RS line back to high
          RET
;
;
;                     **********************
;       Tis routine serially outpuuts the data to a CD4034 serial
;       to parallel converter and into the LCD registers
;
          CLRA  LDATA                          ;clear data bit
LCDOUT:   LD    B,08                           ;set up bit count
LLOOP1:   LD    A,D                            ;transfer byte to accumulator
          RLA                                  ;rotate into carry
          LD    D,A                            ;and store remainder of byte
          JR    NC,LCDCP                       ;in zero do a clock pulse
          SETA  LDATA                          ;if not set data line to 1
LCDCP:    APULSE LCLK                          ;generate clock pulse
          CLRA  LDATA                          ;reset data line to low
          DEC   B                              ;decrement bit count
          JR    NZ,LLOOP1                      ;if not done get next bit
          LD    A,(LINPTR)
```

```
          BIT       1,A
          JP        NZ,DISP2
DISP1:    APULSE    LENA1                    ;otherwise generate
          JP        LCDEXT
DISP2:    APULSE    LENA2
;
LCDEXT:   RET                                ;and done...
;
;****************************************************************
;
;         Multiply two 8 bit numbers> 16 bit result
;         reg C: multiplier
;         reg D: muultiplicand
;         reg BC: Result
;
MULT:     LD        B,0                      ;initiaize most significant
bit
          LD        E,09                     ;set up bit count
MULT0:    LD        A,C                      ;rotate least significant bit
of
          RRA                                ;multiplier to carry and shift
          LD        C,A                      ;low order byte in the result
          DEC       E                        ;decrement bit couunt
          JP        Z,MUDONE
          LD        A,B
          JP        NC,MULT1
          ADD       A,D                      ;add multiplicand to high
order byte
                                             ;of result if bit was a one.
MULT1:    RRA                                ;carry=0 come here,shift high
order
                                             ;byte of result.
          LD        B,A
          JP        MULT0
MUDONE:   RET
;
;
;****************************************************************
;
;         EXIT CODE FOR FORTRAN COMPILER
;
$EX:      HALT
;
;
;         FORTRAN FUNCTION ERROR PROCESSING
;
$ERR:     POP HL              ;STORE POINTER TO ERROR CODE IN REG HL
          LD A,(HL)           ;ERROR CODE IN ACCUM
;         LD (ERRB),A         ;store in LSB portion of error integer
;         LD A,00H
;         LD (ERRB+1),A       ;make sure MSB is a zero
;         CALL ERRS           ;output error message...
;         CALL DISOUT         ;and display
          INC HL
          PUSH HL
          RET
;
;
;****************************************************************
;
;         Character delete routine
;
```

```
;
CHRDEL:  LD      HL,CHRCNT              ;check number of characters outputted
         LD      A,00                   ;compare to none
         CP      (HL)                   ;if down to zero
         RET     Z                      ;return
;
         DEC     (HL)                   ;else decrement character count
         LD      A,(COLPTR)             ;decrement column pointer
         DEC     A
         LD      (COLPTR),A             ;and store
         LD      HL,(DISPTR)            ;get RAM display pointer
         DEC     HL                     ;derement it
         LD      (DISPTR),HL            ;and save it
         LD      A,' '                  ;put a blank in delete character
         LD      (HL),A
         CALL    POSCUR                 ;and position cursor accordingly
         RET
;
;
;****************************************************************
;
;
CHROUT:  LD      HL,CHRCNT              ;get adress of character counter
         LD      A,(CHRMAX)             ;put maximum in to accumulator
         CP      (HL)                   ;and do a compare
         RET     Z                      ;if maximum reached than return
;
         LD      A,(LINPTR)             ;find type of variable
         AND     A                      ;check bit 7=1,numeric
         JP      P,ALPOUT               ;if 0 than alpha
         LD      A,(CHRIN)              ;get character
         CP      '0'                    ;is it in the numeric range
         RET     C                      ;if less than zero exit
         CP      '9'+1                  ;if greater than 9
         RET     NC                     ;exit also
;
ALPOUT:  INC     (HL)                   ;else,increment character count
         LD      A,(CHRIN)              ;get charcater
         LD      HL,(DISPTR)            ;get current pointer RAM display
         LD      (HL),A                 ;and load character into RAM
         LD      A,01                   ;set up a transfer of one
         LD      (CHRNUM),A             ;character to the LCD display
         CALL    LINOUT                 ;call for transfer
         LD      HL,(DISPTR)            ;get the pointer again
         INC     HL                     ;increment and
         LD      (DISPTR),HL            ;   save.
         LD      A,(COLPTR)             ;get column pointer
         INC     A                      ;increment it and
         LD      (COLPTR),A             ;save it also
         RET
;
;****************************************************************
;
;
;
;
```

```
MNUSET: CALL    MOVRAM          ;move active menu to RAM
        CALL    MOVDIS          ;copy it to the LCD display
MNUPNT: CALL    PNTVDB          ;paint in all the variables as stored
in RAM
        CALL    POSCUR          ;move cursor to the first variable
        CALL    CURON           ;turn on appropriate cursor
        RET
;
;
;****************************************************************
;
MNUIN:  LD      A,(CHRFLG)      ;check if character came in
        AND     A               ;set flags
        JP      Z,MNUIN         ;if  still zero loop
        XOR     A               ;set accumulator=0
        LD      (CHRFLG),A      ; to reset character flag.
        LD      A,(CHRIN)       ;get the character
        CP      SELECT          ; is it a SELECT key?
        JP      Z,PROVAR        ;go process as a variable entry
        CP      DONE            ;is it a DONE key if so process
variable
        RET     NZ              ;else retuurn
;
;                               process variable as numeric or alpha
;                               when DONE or SELECT is keyed
PROVAR: LD      A,(CHRCNT)      ;       get character count to this
point
        LD      C,A             ;store in register C
        LD      B,00            ;initialize reg B
        LD      HL,(DISPTR)     ;get pointer to current display
        SBC     HL,BC           ;generate address to beginning of
variable in HL
        LD      A,(LINPTR)      ;do ASCII to binary conversion
        AND     A               ;if bit 7=1,than an ASCII numeric
variable
        JP      P,MNUALP        ;else a alpha variable
        LD      A,(CHRMAX)      ;get chrarcter length in accumulator
        CALL    ASC2B           ;do conversion
        EX      DE,HL           ;HL has binary result,store in DE for
now
        LD      HL,(VARPTR)     ;find out where this variable goes
        LD      (HL),E          ;get LSB, and store
        INC     HL
        LD      (HL),D          ;get MSB, and store
        JP      MNUIEX
;
MNUALP: LD      DE,(VARPTR)     ;get destination address on RAM to
move alpha
        LD      A,(CHRMAX)      ; variables, get the number of
characters
        LD      C,A             ;into counter C ,HL has source address
        LD      B,0             ;initaialize B to zero
        LDIR                    ;and do block transfer
;
MNUIEX: RET
;
;
;***************************************************************
*******
;
;                               output display variable for current
```

```
          VDB then
INCVDB:   CALL     MOVVDB              ;move next variable definition block
to active.
          CALL     POSCUR              ;position cursor accordingly
          CALL     CURON               ;and turn on the appropriate display
cursor
          RET
;
;
;.XLIST
 .LIST
  PAGE
;
;
;****************************************************************
;
;
;         MA2400 A/D converter routines using internal firmware
;         153 bytes allocated at M24RAM for its use, IX register
;         contains pointer to it.
;
          MATH     EQU      0E3EBH
          READRW   EQU      0E246H
          READRF   EQU      0E1E3H
          READO    EQU      0E180H
          AUTOGN   EQU      0E2A7H
          CHOFST   EQU      001                 ;Channel offset
          GAIN1    EQU      000                 ;Gain=1 code
          ADPRT0   EQU      0E0H                ;MA2400 i/o port
0;gain,channel
;
ADTSK:    LD       IX,M24RAM           ;point to allocated ram via IX
          LD       HL,M24RAM-1         ;initialize a/d conversion
space
          LD       C,10                ;all ten bytes
          LD       A,00
ADLP:     INC      HL
          LD       (HL),A
          DEC      C
          JP       NZ,ADLP             ;.... done?
          LD       A,CHOFST+1          ;setup lower nibble for
channel 1
          OR       GAIN1               ;upper nibble with gain=1
          LD       (M24RAM+0),A        ;load into location 0 of ram
space
          CALL     ADSEQ1              ;invoke MA2400 firmware
          LD       DE,ADBUF            ;initialize byter xfer
destination
          CALL     ADXFER              ;xfert real number to common
ram
          PUSH     DE                  ;save pointer to A/D buffer
          LD       (IX+04),00          ;reset raw a/d data area
          LD       (IX+05),00
          LD       A,CHOFST+2          ;set up lower nibble for
channel 2
          OR       GAIN1               ;upper for gain=1
          LD       (M24RAM+0),A        ;load into location 0
          CALL     ADSEQ2              ;invoke firmware without
ref,zero check
          POP      DE                  ;get pointer to next block
          CALL     ADXFER              ;and xfer to common ram
          RET
;
```

;
;
;*******************************************************************
;
;       MA2400 firmware calls, exits with double precision
;       FPN in location 32-39 of MA24RAM block.
;

```
ADSEQ1: CALL    READRW                  ;reads channel and converts to
fpn
        CALL    READRF                  ;reads reference
        CALL    READ0                   ;reads zero
        CALL    MATH                    ;corrects,and outputs channel
in volts
        RET
ADSEQ2: CALL    READRW                  ;reads channel and converts to
FPN
        CALL    MATH                    ;corrects,and outputs volts
fpn
        RET
```
;
;
;*******************************************************************
*
;
;       Transfers MA2400 result to common memory for FORmulaTRANslator
;       program.

```
ADXFER: LD      HL,M24RAM+36            ;point to source of fpn result
        LD      BC,04                   ;byte count for single
precision
        LDIR                            ;block xfer
        RET
;
        CSEG
```
;
;
;
        PUBLIC  ASC2B,B2ASC
;
;*******************************************************************
****
;
;       on entry:
;       HL-contains beginning address of ASCII numeral (MSB)
;       A -contains the number of numerals toconvert
;
;       on exit:
;       HL-contains the binary number(16 bits)
;
;       Converts ASCII numeric string, MSB starting at HL and length
in C
;       (max=6) to BCD number beginning at NUMD0 to NUMD2(3 bytes)
;       NUMD0 is the LSB of the BCD number.
;       The ASCII string is first moved to processing buffer ASCBUF
;
```
ASC2B:  LD      (ASCPTR),HL             ;store pointer to ASCII numeral string
        LD      (ASCLEN),A              ;as well as its lenght
;
        LD      C,06                    ;put ASCII zeroes in the processing
buffer
        LD      HL,ASCBUF               ;into all 6 bytes
        LD      A,'0'
```

```
ASCLR:      LD      (HL),A              ;do until all done
            INC     HL
            DEC     C
            JP      NZ,ASCLR
;
            LD      HL,NUMD0            ;starting at LSB byte for three bytes
            XOR     A
            LD      (HL),A              ;do until all done
            INC     HL
            LD      (HL),A
            INC     HL
            LD      (HL),A
;
            LD      B,00                ;time to transfer the ASCII numeric string
            LD      HL,(ASCPTR)         ;from LSB to MSB as determined by lenght
            LD      A,(ASCLEN)          ;get beginning of ASCII string add to
            LD      C,A                 ;the lenght to get to the LSB address.
            ADD     HL,BC
            DEC     HL                  ;adjust pointer to LSB of numeric string
            LD      DE,ASCBUF           ;get the destination address
MOVASC:     LD      A,(HL)              ;get ASCII bytes sequentially
            LD      (DE),A              ;transfer to ASCII buffer inversly LSB first
            DEC     HL                  ;get next highest byte
            INC     DE                  ;and increment buffer address
            DEC     C                   ;uuntil all have been transferred LSB first
            JP      NZ,MOVASC           ;   to MSB last.
;
            LD      HL,ASCBUF           ;now do the ASCII to bcd conversion
            LD      DE,NUMD0            ;and put into NUMD0 as the LSB
            LD      A,(ASCLEN)          ;get the lenght of the buffer
            LD      C,A                 ;save it in the counter
A2BLP:      LD      A,(HL)              ;get first ASCII numeral
            AND     0FH                 ;strip off MSN 30H
            LD      B,A                 ;and temporarily store
            INC     HL                  ;point to next one
            LD      A,(HL)              ;get it
            AND     0FH                 ;strip off ASCII stuff
            RLCA                        ;shift left 4 times to
            RLCA                        ;   upper nible.
            RLCA
            RLCA
            OR      B                   ;logic or with lower nibble
            LD      (DE),A              ;and store into BCD buffer
            INC     DE                  ;point to next BCD byte
            INC     HL                  ;and to the next ASCII numeral
            DEC     C                   ;decrement the character count by 2
            DEC     C
            JP      M,A2LPEX            ;exit for odd length ASCII numerals
            JP      NZ,A2BLP            ;exit if all characters are done.
A2LPEX:     CALL    BCD2B               ;do BCD to binary conversion
            LD      HL,(NUM0)           ;load binary result into HL
            RET
;
;
;
;*******************************************************************
**
```

```
;
;
;       BCD to Binary conversion. A 3 byte BCD number(NUMD0-NUMD2)
;       is converted to a 2 byte binary number NUM1-NUM0
;
BCD2B:  LD      HL,00           ;clear the binary number output
        LD      (NUM0),HL
        SCF                     ;set the carrry flag to indicate end processing
D2BLP:  LD      A,(NUM1)        ;get first binary number
        RR      A               ;rotate right through carry (divide by 2)
        LD      (NUM1),A        ;and save
        LD      A,(NUM0)        ;get LSB of binary number
        RR      A               ;rotate right thru carry
        LD      (NUM0),A        ;and save
        RET     C               ;if no carry not done with all 16 bits.
;
        LD      A,(NUMD2)       ;now to divide BCD number by two
        RR      A               ;rotate right thru carry
        PUSH    AF              ;save flag
        BIT     3,A             ;check to see if lower nibble >=8
        JP      Z,NXTD2H        ;if not check higher nibble
        SUB     03H             ;else subtract 3 from nibble to correct weight
NXTD2H: BIT     7,A             ;check hihe nibble
        JP      Z,NXTD1         ;if not >= 8 than got to next number
        SUB     30H
NXTD1:  LD      (NUMD2),A
;
        POP     AF              ;get flag
        LD      A,(NUMD1)       ;now to divide BCD number by two
        RR      A               ;rotate right thru carry
        PUSH    AF
        BIT     3,A             ;check to see if lower nibble >=8
        JP      Z,NXTD1H        ;if not check higher nibble
        SUB     03H             ;else subtract 3 from nibble to correct weight
NXTD1H: BIT     7,A             ;check hihe nibble
        JP      Z,NXTD0         ;if not >= 8 than got to next number
        SUB     30H
NXTD0:  LD      (NUMD1),A
;
        POP     AF
        LD      A,(NUMD0)       ;now to divide BCD number by two
        RR      A               ;rotate right thru carry
        PUSH    AF
        BIT     3,A             ;check to see if lower nibble >=8
        JP      Z,NXTD0H        ;if not check higher nibble
        SUB     03H             ;else subtract 3 from nibble to correct weight
NXTD0H: BIT     7,A             ;check hihe nibble
        JP      Z,NXTD          ;if not >= 8 than got to next number
        SUB     30H
NXTD:   LD      (NUMD0),A
;
        POP     AF
        JP      D2BLP
;
;
;************   16 bit BINARY to BCD number conversion Routine (B2DEC)
;
```

```
;       NUMD0:  storage for BCD converted value
;       NUM0:   temporary storage for binary number(unsigned)
;
;       HL contains number to converted
;       ASCBUF contains the answer
;  Upon completion a two byte binary number will be converted to
; a three byte binary coded decimal number unsigned. A decimal adjust
; algorithm is implemented for the conversion.
;
        NBCD    EQU     03H             ;number of decimal bytes needed
        NINDEX  EQU     NBIN*8          ;total bits necessary to shift
        NBIN    EQU     02H             ;number of binary bytes
;
B2ASC:  LD (NUM0),HL                    ;save number in NUM0
        LD HL,NUMD0                     ;point to BCD bytes
        LD A,0
        LD (HL),A                       ;initialize BCD to zero
        INC HL
        LD (HL),A
        INC HL
        LD (HL),A                       ;all three done
        LD B,NINDEX                     ;store number of bits to shift
AGAIN:  LD HL,NUM0                      ;point to low byte of binary
        RL (HL)                         ;rotate left through carry
        INC HL                          ;point to high byte
        RL (HL)                         ;rotate left through carry
ALGO:   LD C,NBCD                       ;store number of BCD bytes
        LD HL,NUMD0                     ;point to beginning of BCD
DBL:    LD A,00H                        ;clear accumulator
        ADC A,(HL)                      ;add with carry to BCD
        DAA                             ; decimal adjust
        JP C,ADD1                       ;number too big? goto next byte
        ADC A,(HL)                      ;double the number
        DAA
        JR DECN1                        ;goto next BCD byte
ADD1:   ADD A,(HL)                      ;double the number
        SCF                             ;set carry
DECN1:  LD (HL),A                       ;save this byte
        INC HL                          ;point to next BCD byte
        DEC C                           ;number bcd bytes left
        JP Z,DECINX                     ;if zero get next binary bit
        JP DBL                          ;otherwise do it again!
DECINX: DEC B                           ;reduce number of binary bit count
        JP NZ,AGAIN                     ;if not zero do it again
BCDOUT: CALL D2ASC                      ;call BCD to ASCII
        RET
;
;
;**************** BCD to ASCII Conversion Routine (D2ASC)
;
;
;       ASCINP:  ASCII output buffer
;       NUMD0-NUMD2:  Contains the BCD number
;       NBCD:  Number of BCD bytes
;
; This routine converts a stored BCD number into ASCII code and stores
;               it in ASCBUF.
;
;
;
        ASCNUM  EQU     30H             ;ASCII base for numbers
;
;
D2ASC:  LD B,NBCD                       ;load number of decimal bytes
```

```
                LD      DE,ASCBUF-1             ;point to ASCII output buffer
                LD      HL,NUMD0+NBCD-1         ;pointer to MSB of BCD
DAGAIN:         LD      A,(HL)                  ;get BCD byte
                AND     0F0H                    ;mask off lower nibble
                JP      NZ,FNUM                 ;check if number began,i.e. not zero
                INC     DE
                LD      A,' '                   ;if leading zeroes put blanks
                LD      (DE),A                  ;in outpuut buffer.
;
                LD      A,(HL)                  ;if zero get nuumber again
                AND     0FH                     ;now mask off upper nibble
                JP      NZ,SNUM                 ;if not zero go proceess
                INC     DE                      ;else increment to next buffer
location
                LD      A,' '
                LD      (DE),A                  ;put in space if all leading zeroes
                DEC     HL                      ;else point to next number
                DEC     B                       ;decrement byte count
                JP      NZ,DAGAIN               ;if not do it again
;
                LD      A,'0'                   ;if still zero after all that
                LD      (DE),A                  ;put zero in last loacation
                JP      D2AEX                   ;and exit.
;
FNUM:           LD      A,(HL)
                SRL     A
                SRL     A                       ;shift upper nibble into lower nibble
                SRL     A
                SRL     A
                OR      ASCNUM                  ;add ASCII base number to upper nibble
                INC     DE
                LD      (DE),A                  ;store in out buffer
;
                LD      A,(HL)                  ;work on low nibble
                AND     0FH                     ;strip upper nibble  off
SNUM:           OR      ASCNUM                  ;    add ASCII base
                INC     DE
                LD      (DE),A                  ;out tobuffer
                DEC     HL                      ;point to next lower BCD byte
                DEC     B                       ;decrenent BCD byte count
                JP      NZ,FNUM                 ;do next byte if not finished
;
D2AEX:          RET
;
;
;****************************************************************************
;
;       Reads BCD at CD4021 and brings in serially
;
                BCDCLK  EQU     00              ;port for clocking shifts at 4021
                PS      EQU     01              ;port ctrls parallel/serial modes of
4021
                SERIN   EQU     03              ;serial data input port,from 4021
                OVRRNG  EQU     04              ;over range data input port
                DECPNT  EQU     05              ;decimal point data input port
;
BCD2SI:         SETB    PS                      ;jam in parallel BCD data into 4021
                CLRB    PS                      ;restore to serial mode
                XOR     A                       ;clear accum
                LD      (DPFLG),A               ;clear flags,decimal point
                LD      (ORFLG),A               ;overrange flag.
                IN      A,(PBIO)                ;get status of dec pt. and overrange
```

```
            LD      D,A                     ;save in d reg temporarily
            BIT     OVRRNG,A                ;check if overange bit on.
            JP      Z,B2SJP0                ;if not keep on movin'
            LD      A,01                    ;else set byte flag to a 1
            LD      (ORFLG),A
            JP      B2SEX                   ;and exit
;
B2SJP0:     LD      A,D                     ;get ststus of decimal ouut of d reg
            BIT     DECPNT,A                ;check its value
            JP      Z,B2SJP1                ;if zero,skip
            LD      A,01                    ;else set decimal pt flag
            LD      (DPFLG),A
;
B2SJP1:     LD      HL,00                   ;initialize data destination register
            LD      C,16                    ;   and shift counter.
B2SLP0:     ADD     HL,HL                   ;shift the data inputted
            IN      A,(PBIO)                ;get data at serial port
            BIT     SERIN,A                 ;check bit value at serial inpuut port
            JP      Z,SIEZIP                ;if serial input is zero than skip
            SET     0,L                     ; else set the lsb of HL register
SIEZIP:     BPULSE  BCDCLK                  ;serailly clock the next bit in
            DEC     C                       ;are all bits done
            JP      NZ,B2SLP0               ;if not do again,
            LD      (NUMD0),HL              ;else save the BCD value in memmory
            XOR     A                       ;and zero out the third byte anyway
            LD      (NUMD2),A
B2SEX:      RET                             ;and return
;
;
;*************************************************************;
;
;       Processes symbols,messages and BCD number s into the LCD-7
;       display buffer(DISBUF) for serial transmission to Hughes HLCD
; 0438A
;       LCD display driver.
;       1. Checks symbol flags and sets appropriate byes
;       2. Takes BCD number(4 digits) and seven-segment codes it
;       3. If error flag set displays message in display buffer
;
; BYTE      0           1(MSD)      2           3           4(LSD)
;       {|1xxxSYMB|0abcdefg|0abcdefg|0abcdefg|0abcdefg|}  DISBUF bit
; map
;       {a,b,c,d,e,f,g} segment codes      SYMB=symbol byte
;
D2LCD:      LD      B,00                    ;initialize leading zero
 suppress flag
            LD      HL,SYMB                 ;get symbol byte
            RES     0,(HL)                  ;reset decimal pt. symbol
            LD      A,(ORFLG)               ;check the overrange flag
            AND     A
            JP      NZ,DISMSG               ;if not zero send messsage
            LD      A,(DPFLG)               ;else check decimal pt flag
            AND     A
            JP      Z,D2LCD1                ;if zero skip
            LD      HL,SYMB                 ;else set the decimal pt
 symbol
            SET     0,(HL)
D2LCD1:     LD      D,0                     ;initilaize code offset
 address
            LD      C,04                    ; and character count
            LD      IY,DISBUF+1             ;IY register points to display
 buffer
            LD      HL,(NUMD0)              ;get BCD value in memmory
```

```
D2LLP:      LD      A,H                     ;get BCD bytes into
accuumulator
            AND     0F0H                    ;strip off all but MSD of BCD
            RLCA                            ;rotate into lower nibble
            RLCA
            RLCA
            RLCA
            LD      E,A                     ;save index to 7 segment code
table
;
            CP      00                      ;surpress leading zero algo
            JP      NZ,D2LJP0               ;if not a zero than output as
usual
            OR      B                       ;else check if non zero
received flag
            JP      NZ,D2LJP0               ;if not zero than not leading
zero
            LD      (IY+0),A                ;else output a blank(0) to
disp buffer
            JP      D2LJP1                  ;and skip coding.
;
D2LJP0:     SET     0,B                     ;set non zero leading flag
            LD      IX,NUMCOD               ;get address of 7 segment code
            ADD     IX,DE                   ;generate address to the code
needed
            LD      A,(IX+0)                ;get the code
            LD      (IY+0),A                ;and put it into display
buffer
D2LJP1:     INC     IY                      ;increment to next byte in the
display
            ADD     HL,HL                   ;shift the BCD value to next
digit
            ADD     HL,HL
            ADD     HL,HL
            ADD     HL,HL
            DEC     C                       ;are all the charcters done?
            JP      NZ,D2LLP                ;if not do again
            BIT     0,B                     ;checkif all data is zeroes
            JP      NZ,D2LEX                ;if not than skip
            LD      A,07EH                  ;else load in '0' code
            LD      (DISBUF+4),A            ;and put in display buffe
            LD      (DISBUF+3),A
D2LEX:      RET                             ;and exit.
;
DISMSG:     LD      BC,04                   ;set up byte count
            LD      HL,DMSG1                ;source message
            LD      DE,DISBUF+1             ;destination message
            LDIR                            ;do transfer
            RET                             ;and return.
;
;********************************************************************
****
;
;       Outputs the contents of the 7 segment LCD display
buffer(DISBUF)
;       to the ouput ports serially.
;
            LCDDAT  EQU     00
            LCDCLK  EQU     01
            LCDBYT  EQU     05
;
DISOUT:     LD      HL,DISBUF               ;get address of LCD-7 display
buffer
```

```
            LD      C,LCDBYT            ;nuumber of bytes to transmit
 serially
   DISLP0:  LD      B,07                ;start with assumption that
 alpha code
            LD      A,(HL)              ;get coded chrarcter in DISBUF
            AND     A                   ;set flags
            JP      P,NUMR              ;if bit 7=0 must be alpha code
            RLA                         ;else must be 4 bit symbol
 byte
            RLA                         ;and shift to left
            RLA                         ;into bit 6 position
            LD      B,04                ;and set bit couunt to 4
   NUMR:    RLA                         ;whether alpha or symbol shift
 to bit 7
            LD      D,A                 ;and save in D register
   DISLP1:  LD      A,D                 ;load accum with data in D
 register
            RLA                         ;shift into carry
            LD      D,A                 ;store remainder in register D
            JP      NC,DISCLK           ;if no carry skip
            SETA    LCDDAT              ;else set port to a 1
   DISCLK:  APULSE  LCDCLK              ; and generate clock pulse
            CLRA    LCDDAT              ;clear data port to 0 again
            DEC     B                   ;decrement the bit count
            JP      NZ,DISLP1           ;if not done loop again
            INC     HL                  ;else increment the pointer to
 next byte
            DEC     C                   ;decrement byte count
            JP      NZ,DISLP0           ;if not done,do again
            RET                         ;else exit.
 ;
 ;
            END

END

TITLE ULTRA.MAC

;
 ;****************************************************************
 ;
 ;      ULTRASONIC CONCRETE TESTER- instrument to measure concrete
 ;
 ;                  integrity underwater.
 ;
 ;      Author: Roman VSEVOLOD Kruchowy              Date:  NOV 19
 1987
 ;
 ;
    .SALL
    .XLIST
 ;  LIST
    PAGE
 ;
 PCDDR   EQU     06H         ;PORTC DATA DIRECTION REGISTER
 PCIO    EQU     02H         ;port C I/O
 PCBC    EQU     0AH         ;port C clear, write only
 PCBS    EQU     0EH         ;port C set,write only
 ;
 PBDDR   EQU     05H         ;PORTB DATA DIRECTION REGISTER
 PBIO    EQU     01H         ;PORTB I/O REG
```

```
PBBC     EQU     09H          ;PORTB CLEAR WRITE ONLY
PBBS     EQU     0DH          ;PORTB SET WRITE ONLY REG
;
PADDR    EQU     04H          ;PORTA DATA DIRECTION REG
PAIO     EQU     00H          ;PORTA I/O REG
PABC     EQU     08H          ;PORTA CLEAR REG
;
PABS     EQU     0CH          ;PORTA SET WRITE ONLY REG
PAMDR    EQU     07H          ;MODE DEF REG PORTA
;
T0CMR    EQU     018H         ;TIMER 0 COMMAND REG
T0LSB    EQU     010H         ;TIMER 0 LSB
T0MSB    EQU     011H         ;  "     "  MSB
T0STP    EQU     014H         ;  "     "  STOP REG
T0STRT   EQU     015H         ;  "     "  START REG
T1CMR    EQU     019H         ;TIMER 1 COMMAND REG
T1LSB    EQU     012H         ;TIMER 1 LSB
T1MSB    EQU     013H         ;  "     "  MSB
T1STP    EQU     016H         ;  "     "  STOP REG
T1STRT   EQU     017H         ;  "     "  START REG
;
STACK    EQU     07FFFH       ;STACK BEGIN HERE
RAMTOP   EQU     07000H
ONE      EQU     0001H
;
T0MODE   EQU     039H         ;PRESCALE =64,SINGLE READ,MODE 1
T1MODE   EQU     0A5H         ;PRESCALE =01,SINGLE READ,MODE 6
MODU1    EQU     28           ;COUNT MODULUS FOR F1 WITH 2.0 MHZ IN
MODU2    EQU     34           ;COUNT MODULUS FOR FREQ F2 WITH 2.0 MHZ IN
SEC.2    EQU     65522        ;counts per 2 sec @ 2mhz/64
MODU0    EQU     SEC.2-1      ;TIMER 0 MODULUS(2SEC)
SEC.1    EQU     32761-5              ;SEC.2/2 -5   1 sec delay
;
NRSTA    EQU     08           ;ICRB bit position for RSTA interrupt
NRSTB    EQU     04           ;  "    "     "     "  RSTB    "
NRSTC    EQU     02           ;  "    "     "     "  RSTC    "
NINTR    EQU     01           ;  "    "     "     "  INTR    "
NALL     EQU     0FH          ;ALL interrupts enabled
;
;
;
;
 PAGE
SETA     MACRO   N
         LD A,01 SHL N
         OUT (PABS),A         ;SETS PORT A BIT N
         ENDM
;
CLRA     MACRO   N
         LD A,01 SHL N
         OUT (PABC),A         ;CLEARS PORT A BIT N
         ENDM
;
APULSE   MACRO N              ;GENERATES A PULSE ON PORT A,BIT N
         LD A,01 SHL N        ;...1...0
         OUT (PABS),A
         OUT (PABC),A
         ENDM
;
SETB     MACRO   N
         LD A,01 SHL N
         OUT (PBBS),A         ;SETS PORT B BIT N
         ENDM
```

```
;
CLRB    MACRO   N
        LD A,01 SHL N
        OUT (PBBC),A                ;CLEARS PORT B BIT N
        ENDM
;
BPULSE  MACRO   N
        LD A,01 SHL N               ;generates pulse on port B bit N
        OUT (PBBS),A
        OUT (PBBC),A
        ENDM
;
;
CPULSE  MACRO   N
        LD A,01 SHL N               ;generates pulse on port C bit N
        OUT (PCBS),A
        OUT (PCBC),A
        ENDM
;
READA   MACRO   N
        IN A,(PAIO)                 ;READ PORT A BIT N
        BIT N,A
        ENDM
;
ENAICR  MACRO   N
        LD A,N                      ;enables interupts via ICRB
        OUT (0BBH),A
        ENDM
;
;.XLIST
 .LIST
  PAGE
;
;
;External Subtoutines
        ENTRY   $INIT
        EXT
LCDINI,MOVRAM,MOVDIS,MOVVDB,POSCUR,CURON,PNTVDB,ASC2B,B2ASC
        EXT     CHRDEL,CHROUT,MNUSET,MNUIN,INCVDB,CALCS,ADTSK,LINOUT
        EXT
CALCS,ADTSK,VDBSET,MULT,BCD2B,BCD2SI,D2LCD,DISOUT,MNUPNT
;
;
;External Variables(globals)
        EXT     KEYTBL,KELTBL,KEMTBL,KERTBL
        EXT     RAMDISP,DISPTR,MNUPTR,VDBPTR,KEYPTR,LINPTR,COLPTR
        EXT     VARPTR,CHRMAX,CHRCNT,CHRNUM,CHRIN,CHRFLG,MNUNUM,VDBNUM EXT     NCAL,NUM0,NUM1,NUMD0,NUMD1,NUMD2
        EXT     ASCLEN,ASCPTR,ASCBUF,ASCEND,M24RAM
        EXT     STRBEG,STREND,OUTPTR,OUTBUF,OUTCNT
        EXT     ADBUF,ORFLG
        EXT     VDBNUM,CALCJB,VDBREQ,USTORE
        EXT     SYMB,MTT,NUM0,RTGNUM,CONTBL,CONRTG,ATYPE,PRTPTR
        EXT     DESCRI,PR$
        EXT     MNUOLD,LINCNT,NUMD0,NUMD1,NUMD2
;
;****************************************************************
;*
;
;       Program start on power-on
;
        ASEG
        ORG 0000H
```

```
        JP      $INIT
;
;
;
;
;********************************************************************
;
        ORG     100H
;
        ADPRT1  EQU     0E1H                ;MA2400 port 1,ctrl byte
;
$INIT:  LD      SP,STACK
        XOR     A                           ;reset flags and accumuulator
                                            ;set mode for PORT A
        OUT     (PAMDR),A                   ;    as straight I/O
;
        LD      A,010H                      ;port C bit 4    set for output
        OUT     (PCDDR),A
;
        LD      A,0FFH                      ;PORT A bits 0-7  set for outpuut
        OUT     (PADDR),A
;
        LD      A,07H                       ;Port B bits 0-2    set for output
        OUT     (PBDDR),A
;
        OUT     (T0STP),A                   ;stop timer 2
        OUT     (T1STP),A                   ;stop timer 1
;
        LD      A,02H                       ;enable MA2400 EPROM in E000H
        OUT     (ADPRT1),A
        LD      IX,M24RAM                   ;point to MA2400 ram space
        LD      (IX+120),0E0H               ;load valuue of MA2400 base port
        LD      (IX+119),0E0H               ;MA2400 EPROM
        LD      (IX+118),000H               ;          base address
        LD      A,01                        ;point to display 1
        LD      (LINPTR),A
        CALL    LCDINI                      ;call LCD initialize display 1
;
        LD      A,02
        LD      (LINPTR),A                  ;point to display 2
        CALL    LCDINI                      ;initialize display 2
;
        LD      HL,00
        LD      (MNUNUM),HL                 ;point to MENU0
        LD      (MNUOLD),HL
        LD      (VDBNUM),HL                 ;first variable in menu
;
;
        LD      A,80H                       ;initialize symbol byte in 7 seg
        LD      (SYMB),A                    ;display output buffer(DISBUF).
;
;************** UART initialization
;
        UBASE   EQU     0C0H                ;base I/O address of UART
        BAUDN   EQU     0DH                 ;baud rate code,1200
        BAUD    EQU     04H+UBASE           ;baud rate register
```

```
                USTAT     EQU     03H+UBASE         ;UART status
                SETCTL    EQU     02H+UBASE         ;control register
                NRXD      EQU     01H+UBASE         ;received data
                NTXD      EQU     00H+UBASE         ;transmit data adresss
                UCTLB     EQU     00111101B         ;intrupt mode
                                                    ;no  parity
                                                    ;8 data bits,two stop
                PUBLIC    USTAT
                EXT       UIBPTR,UICNT,UOCNT,UOBPTR,UIBUFF
;
UINIT:
                LD        A,0                       ;set CTL reg TR bit =0
                OUT       (SETCTL),A                ;so that CTL can be loaded
                LD        A,UCTLB                   ;load in UART control byte
                OUT       (SETCTL),A                ;into control reg
                LD        A,BAUDN                   ;config for 9600 baud
                OUT       (BAUD),A
                LD        A,(USTAT)                 ;reset any interrupts
                XOR       A                         ;initialize input charcter count
                LD        (UICNT),A
                LD        HL,UIBUFF                 ;initialize  ASCII input buffer
pointer
                LD        (UIBPTR),HL
                IN        A,(NRXD)                  ;clear any input intrupts during
boot
;
;****************************************************************
;
                LD        HL,KEYTBL                 ;point to direct keypad input
                LD        (KEYPTR),HL               ; table and store in table
pointer.
                XOR       A                         ;reset character received
flag.
                LD        (CHRFLG),A
                LD        (VDBREQ),A                ;point to first variable in
menu 0
                CPULSE    04                        ;clear keypad interrupt latch.

ENAICR    NRSTA+NRSTC+NRSTB         ;enable keypad interrupts via
74C922,
                                                    ;the UART for commnications,
                                                    ;and power fail interrupt.
                EI
;
;
;****************************************************************
*
;
;
                DELETE    EQU     01                ;key codes for special keys(delete)
                SELECT    EQU     05                ;select key code
                DONE      EQU     06                ;enter key code
                STNUM     EQU     05
                ERANUM    EQU     06                ;erase menu position in table
;
;
MAIN:
STMNU:          LD        A,STNUM
                LD        (MNUNUM),A                ;get number of startup menu
                LD        (MNUOLD),A                ;save this menu in old menu address
                CALL      MNUSET                    ;move active menu to RAM
                                                    ;copy it to the LCD display
                                                    ;get variable definition block for
``` that menu

;move cursor to the first variable
;turn on appropriate cursor

```
;
ST1:    CALL    MNUIN           ;get character
;
STXT1:  LD      A,(CHRIN)
        CP      DONE            ;is it a DONE key
        JP      NZ,STXT2        ;if not that than maybe SELECT key
        LD      A,(VDBNUM)      ;else get variable index number
        INC     A               ;incement it to poin to menu table
index
        CP      01              ;was it menuu 1 request(data output)?
        JP      NZ,ST2          ;if not try next...
        XOR     A               ;clear variable data block pointer
        LD      (VDBNUM),A      ;and store.
        LD      A,04            ;get adress of menu to outpuut data
        LD      (MNUNUM),A
        JP      DAOMNU          ;do output data routine.
;
ST2:    CP      02              ; is it resume data acquisition)?
        JP      NZ,ST3          ;if not try next...
MNURTE: XOR     A               ;else,
        LD      (VDBNUM),A      ;clear pointer to first variable
        LD      (MNUNUM),A
        JP      MENU0           ;and got menu 0.
;
ST3:    CP      03              ;is it erase data?
        JP      NZ,STERR        ;if not must be error
        XOR     A
        LD      (VDBNUM),A
        LD      A,ERANUM
        LD      (MNUNUM),A
        JP      ERASMN
;
STERR:  HALT                    ;shouuld never get here.
        JP      STERR
;
STXT2:  CP      SELECT          ;is it a SELECT key
        JP      NZ,ST1          ;if not than nott accepted
        CALL    INCVDB          ;else get next VDB
        JP      ST1             ;and wait for character
;
;*****************************************************************
**
;
;
;
ERASMN: CALL    MNUSET          ;move active menu to RAM
;
ERAM1:  CALL    MNUIN           ;check if character came in
;
ERAXT1: LD      A,(CHRIN)       ;get the character
        CP      SELECT          ;is it the SELECT key?
        JP      NZ,ERAXT2       ;if not is an execute command(DONE)
        CALL    INCVDB          ;else go and hop to next variable
        JP      ERAM1           ;wait for key input
ERAXT2: CP      DONE            ;is it DONE key?
        JP      NZ,ERAM1        ;if not, then wait for another key
        LD      A,(VDBNUM)      ;else read which entry the cursor is
at
        CP      00
        JP      NZ,ERAXT3       ;if not at zero,try next cursor entry
        JP      STMNU           ;else go to startup menu
```

```
;
ERAXT3: CP      01              ;is cursor at entry !? erase data?
        JP      NZ,ERAM1        ;must be an error go and wait for next key
        XOR     A               ;else
        LD      (OUTCNT),A      ;initialize total line count
        LD      (LINCNT),A      ;page line count
        LD      DE,OUTBUF       ;and transfer header to top of
        LD      (OUTPTR),DE     ;    printout buffer.
        CALL    XFER
        CALL    INI             ;initialize RAM
        JP      MNURTE          ;and return to menu zero(selection menu)
;
;
;
;*******************************************************************
;
;
;
MENU0:  LD      A,(MNUNUM)
        LD      (MNUOLD),A
        CALL    MNUSET          ;move active menu to RAM
                                ;copy it to the LCD display
                                ;get variable definition block for that menu
                                ;move cursor to the first variable
                                ;turn on appropriate cursor
;
MNUM1:  CALL    MNUIN           ;check if character came in
;
MNUXT1: LD      A,(CHRIN)
        CP      DONE            ;is it a DONE key
        JP      NZ,MNUXT2       ;if not that than maybe SELECT key
        LD      A,(VDBNUM)      ;else get variable index number
        LD      (VDBREQ),A      ;store it in the last request
        INC     A               ;incement it to poin to menu table index
        LD      (MNUNUM),A      ;put in menu index
        CP      01              ;was it menuu 1 request(description)?
        JP      NZ,MNU2         ;if not try next...
        XOR     A               ;clear variable data block pointer
        LD      (VDBNUM),A      ;and store.
        JP      DESMNU          ;jump there
;
MNU2:   CP      02              ; is it menu 2(data acquisition)?
        JP      NZ,MNU3         ;if not try next...
        XOR     A               ;else,
        LD      (VDBNUM),A      ;clear pointer to first variable
        JP      DAQMNU          ;and jump to data acqusition
;
MNU3:   CP      03              ;is it menu 4(data output)?
        JP      NZ,MNUERR       ;if not must be error
        XOR     A               ;else,
        LD      (VDBNUM),A      ;clear pointer to first variable in menu
        JP      DAOMNU          ;and do output menu.
;
MNUERR: HALT                    ;shouuld never get here.
        JP      MNUERR
;
```

```
MNUXT2: CP      SELECT              ;is it a SELECT key
        JP      NZ,MNUM1            ;if not than nott accepted
        CALL    INCVDB              ;else get next VDB
        JP      MNUM1               ;and wait for character
;
;****************************************************************
;
MNURET: XOR     A                   ;return to menu 0
        LD      (MNUNUM),A
        JP      MENU0
;
;****************************************************************
;
;       initializes data storage and print arrays
;
XFER:   LD      HL,DESCRI           ;transfer desription menu to
        LD      DE,(OUTPTR)         ;output buffer
        LD      BC,160
        LDIR
;
        EX      DE,HL               ;put destination address in HL
reg
        LD      A,' '+80H           ;put 2 line feedsin print ouut
buffer
        LD      (HL),A              ;by puting space code with 7
bit set
        INC     HL
        LD      (HL),A
        INC     HL
;
        EX      DE,HL               ;put destination address in DE
register
        LD      HL,HD1              ;initialize outpuut buffer
pointer
        LD      BC,HDEND-HD1        ;get length of header
        LDIR                        ;move the block
;
        LD      C,75                ;set up counr for '*' border
        LD      A,'*'
        EX      DE,HL               ;get address of next loc into
HL regs
HDRLP:  LD      (HL),A              ;ld it with a '*'
        INC     HL                  ;increment to next location
        DEC     C                   ;decrement count
        JP      NZ,HDRLP            ;if not done,loop again
        LD      A,'*'+80H           ;else set bit 7 to indiacte
end of line
        LD      (HL),A              ;and store ythat one too.
        INC     HL                  ;bump the pointer
        LD      (OUTPTR),HL         ;save last pointer to out
buffer.
;
        LD      A,(OUTCNT)          ;get current line couunt total ADD     A,09                ;set nuumber of lines to
output=9
        LD      (OUTCNT),A
;description(4)+line(2)+header(3)=9
        LD      A,(LINCNT)
        ADD     A,09                ;get current page count
        LD      (LINCNT),A          ;add header etc
        RET                         ;and save
```

```
;
INI:    LD      HL,STREND               ;initialize string variable
space
        LD      BC,STRBEG               ;get the beginning location
and end
        XOR     A                       ;clear carry
        SBC     HL,BC                   ;get the difference
        LD      C,L                     ;store in counter
        LD      B,H
        LD      HL,STRBEG               ;get starting address
        LD      A,' '                   ;initialize to spaces
NXTSTR: LD      (HL),A                  ;begin loading in RAM
        INC     HL
        DEC     C                       ;decrement counter
        JP      NZ,NXTSTR               ;if not done,keep at it
;
        LD      HL,01                   ;initialize
variables,INTEGER*2
        LD      (NCAL),HL               ;calibration counter,
        RET
;
;
;****************************************************************
;
;
DAOMNU: CALL    MNUSET                  ;move active menu to RAM
;
DAOM1:  CALL    MNUIN                   ;check if character came in
;
DAOXT1: LD      A,(CHRIN)               ;get the character
        CP      SELECT                  ;is it the SELECT key?
        JP      NZ,DAOXT2               ;if not is an execute command(DONE)
        CALL    INCVDB                  ;else go and hop to next variable
        JP      DAOM1                   ;wait for key input
;
DAOXT2: CP      DONE                    ;only DONE allowed to execute
        JP      NZ,DAOM1                ;if not wait for valid key input
        LD      A,(VDBNUM)              ;get variable index
        CP      00                      ;is it zero?(i.e. PRINTER?)
        JP      NZ,DAOXT3               ;if not try,next index.
        LD      A,(OUTCNT)              ;get number of lines to output LD      B,A                     ;store in register B
        LD      HL,OUTBUF               ;get beginning address of data lines
        LD      (PRTPTR),HL             ;and store in output pointer
BLKLP:  CALL    PRNLIN                  ;print line routine
        LD      A,(CHRFLG)              ;check to see if abort is requuested?
        AND     A
        CALL    NZ,DAOKEY               ;check validity of abort
character(DONE).
        DEC     B                       ;decrement line counter
        JP      NZ,BLKLP                ;if not at zero than get next linek
        JP      DAOXT4                  ;when all done exit.
;
DAOXT3: CP      01                      ;is it a computer interface request
        JP      NZ,DAOXT4               ;if not than exit from menu
BLKRES: LD      HL,OUTBUF               ;else poin to the begining of the data LD      (PRTPTR),HL
        LD      A,(OUTCNT)              ;get number of lines to output
        LD      B,A                     ;store in reg B
COMPIN: XOR     A                       ;reset the character input byte
        LD      (UICNT),A
```

```
UINCHK:  LD     A,(UICNT)        ;wait uuntil something shows up
         AND    A                ;set the flag
         JP     NZ,URCVD         ;if not zero,process command letter
         LD     A,(CHRFLG)       ;check to see if keypad  inpuut
occurred
         AND    A                ;set flags
         CALL   NZ,DAOKEY        ;if input occurred go check which
key,abort?
         JP     UINCHK           ;else keep looping wait for computer
to talk
URCVD:   CP     'L'              ;is it a line outpuut command?
         JP     NZ,CMD1          ;if not is it a reset command?
         CALL   PRNLIN           ;else send out a line of output buffer
space
         DEC    B                ;else decrement block count
         JP     Z,COMMSG         ;if end of blocks tell computer done
         JP     COMPIN           ;and do again
;
COMMSG:  LD     HL,MSG1          ;get address of message to comp
         LD     (UOBPTR),HL      ;put in output pointer
         LD     A,01             ;reset end of line flag
         LD     (UOCNT),A
         CALL   UART             ;initiate transfer
         JP     DAOXT4           ;and exit
;
CMD1:    CP     'R'              ;is a block reset command?
         JP     NZ,COMPIN        ;if not must be error and wait for
next cmd.
         JP     BLKRES           ;else point to beginning of data
again.
;
DAOXT4:  LD     A,(MNUOLD)
         CP     00
         JP     NZ,NXT1
         JP     MNURET           ;go back to menu calling menu
NXT1:    CP     STNUM
         JP     NZ,NXT2
         JP     STMNU
NXT2:    HALT
         JP     NXT2
;
DAOKEY:  XOR    A                ;check key input
         LD     (CHRFLG),A       ;clear flag
         LD     A,(CHRIN)        ;get character
         CP     DONE             ;is it a DONE key
         JP     Z,ABORET         ;if so abort job
         RET                     ;else continue as you were.
;
;****************************************************************
;
;
;
DAQMNU:  CALL   MNUSET           ;move active menu to RAM
;
DAQM1:   CALL   MNUIN            ;check if character came in
;
DAQXT1:  LD     A,(CHRIN)
         CP     DONE             ;is it a 'done' key
         JP     NZ,DAQXT2        ;if not that than not acceptable and
exit
         JP     MNURET           ;else return to menu 0
;
DAQXT2:  CP     DELETE
```

```
                JP      NZ,DAQXT3
                CALL    CHRDEL                  ;do a character delete
                JP      DAQM1
;
DAQXT3:         CP      SELECT                  ;was it a select key
                JP      NZ,DAQXT4               ;if not must be a character
input
;
                CALL    DATGET                  ;else, location inputted,get
the data!
;
                LD      A,04                    ;set up for data acquition
menu...
                LD      (MNUNUM),A              ;set up menu number
                XOR     A
                LD      (NUMD0),A               ;zero out the BCD nuumber
buffer
                LD      (NUMD1),A
                LD      (NUMD2),A
                LD      (VDBNUM),A              ;point to first variable
definition blo
                CALL    D2LCD                   ;convert from BCD to LCD
format
                CALL    DISOUT                  ;send out to diver display
                CALL    MNUSET                  ;go and display menu.
DAQLP3:         CALL    KEYIN                   ;wait for key input,returns in
accum
                CP      DONE                    ;looked at it long enough?
                JP      NZ,DAQLP3               ;if some other character try
again
                CALL    MOVOUT                  ;else save the block of data
in
                JP      MNURET                  ;output buffer and go to menu
0
;
;
DAQXT4:         CALL    CHROUT                  ;output character
                JP      DAQM1
;
;
;****************************************************************
;
;
;
DESMNU:         CALL    MNUSET                  ;move active menu to RAM
;
DESM1:          CALL    MNUIN                   ;set flags
;
DESXT1:         LD      A,(CHRIN)
                CP      DONE                    ;is it a 'done' key
                JP      NZ,DESXT2               ;if not than other? Go check it
                LD      DE,OUTBUF               ;store description in description
buffer
                LD      HL,RAMDISP              ;get source address
                LD      BC,160                  ;number of bytes
                LDIR                            ;move the whole thing
                XOR     A                       ;and return to menu 0.
                LD      (MNUNUM),A
                LD      (VDBNUM),A
                JP      MENU0
;
DESXT2:         CP      DELETE
                JP      NZ,DESXT3
```

```
            CALL    CHRDEL                  ;do a character delete
            JP      DESM1
;
DESXT3:     CP      SELECT                  ;was it a select key
            JP      NZ,DESXT4               ;if not must be a character input
            CALL    INCVDB
            JP      DESM1
;
DESXT4:     CALL    CHROUT                  ;output character
            JP      DESM1
;
;
;****************************************************************
;
;       Outputs a line (character, bit 7 set = end of line)
;       of ASCII code through RS232 serial port
;
            FF      EQU     0CH
            CR      EQU     0DH
            LF      EQU     0AH
            EXT     UOCNT,UOBPTR,UART
;
PRNLIN:     LD      HL,(PRTPTR)             ;get pointer to print buffer
            LD      (UOBPTR),HL             ;save in UART output buuffer pointer
            LD      A,01                    ;load in character flag signal end of
            LD      (UOCNT),A               ;line in interrupt routine
            CALL    UART                    ;initiate transfer via interruupts
;
PRCRLF:     CALL    UWAIT                   ;wait till empty
            LD      HL,(UOBPTR)             ;get current pointer in output buffer
            LD      (PRTPTR),HL             ;save cuurrent position
            LD      HL,CRLF                 ;get ready to send carriage and line
            LD      (UOBPTR),HL             ;put address in UART output buffer
            LD      A,01                    ;reset end of line flag
            LD      (UOCNT),A
            CALL    UART                    ;begin transfer
            CALL    UWAIT                   ;wait till done and return
            RET
;
;
;
;
UWAIT:      LD      A,(UOCNT)               ;has last end of line character gone
            AND     A                       ;out yet?
            JP      NZ,UWAIT                ;if not keep waiting
USTLP:      IN      A,(USTAT)               ;else check status to make sure
            BIT     7,A                     ;it has been shipped out.
            JP      Z,USTLP                 ;if not wait until it has.
            RET
;
;
;
;
```

;*****************************************************************
;
;       moves copy of print line PR$ to  output buffer
;
        OUTMAX  EQU     210
        LINMAX  EQU     58
;
MOVOUT: LD      A,(LINCNT)
        INC     A
        LD      (LINCNT),A
        CP      LINMAX
        CALL    Z,NEWPAG
;
        LD      A,(OUTCNT)              ;get number of blocks transferred
        CP      OUTMAX                  ;compare to maximum
        JP      NZ,MOV1                 ;if not there yet do transfer
        LD      A,01                    ;else put error code in
        PUSH    AF                      ;stack it
        JP      ERPROC                  ;and proces error
;
MOV1:   INC     A                       ;increment line count
        LD      (OUTCNT),A              ;and save
        LD      DE,(OUTPTR)             ;get current pointer to output buffer
        LD      HL,PR$                  ;get beginning of RAM display
        LD      BC,80                   ;byte couunt
        LDIR                            ;copy th entire immage to ouutput
        LD      (OUTPTR),DE             ;and store new pointer
MOVOEX: RET
;
;*****************************************************************

;
NEWPAG: XOR     A                       ;reset lincouunt
        LD      (LINCNT),A
        LD      DE,(OUTPTR)             ;get current pointer to outbuffer
        LD      HL,FF$                  ;get pointer to form feed
        LD      BC,02                   ;and character count
        LDIR                            ;xfer to output buuffer
        LD      (OUTPTR),DE             ;save pointer
        LD      A,(OUTCNT)              ;increment total line count
        INC     A
        LD      (OUTCNT),A              ;and save.
        CALL    XFER                    ;and output header info too
        RET                             ; then return
;
;
;*****************************************************************
;
;
KEYIN:
        LD      A,(CHRFLG)              ;wait for response
        AND     A                       ;set flags
        JP      Z,KEYIN                 ;if no response keep looping
        XOR     A                       ;else reset flag
        LD      (CHRFLG),A
        LD      A,(CHRIN)               ;and pt it in the accumulator

RET
;

```
;
;
;****************************************************************
;
;       moves a line message to display but not to  RAM
;       (HL)contains address of message,(A)accumulator contains line.
;
MOVMSG: LD      (LINPTR),A             ;point to line 0
        XOR     A
        LD      (COLPTR),A             ;column 0
        LD      A,40
        LD      (CHRNUM),A             ;do 40 characters
        LD      (DISPTR),HL            ;put in display pointer
        CALL    LINOUT                 ;output that message to LCD
        RET
;
;
;****************************************************************
****
;
;       fill array with readings used in calibration and data
acqusition
;
;
DATGET: XOR     A
        LD      (CHRFLG),A             ;reset the keypad interrupt
flag
;
DATLP1: LD      A,(CHRFLG)             ;read keypad flag
        AND     A                      ;any keypad action during
calibration
        JP      NZ,KEYCHK              ;if so check the request made
;
;
        CALL    BCD2SI                 ;get transit time reading form
BCD
        CALL    D2LCD                  ;convert to 7 seg LCD code
        CALL    DISOUT                 ;ship out to LCD driver
        LD      A,(ORFLG)              ;get overrange flag,
        AND     A                      ;set bits
        JP      NZ,DATLP1              ;if overange ,get another
reading
        CALL    BCD2B                  ;convert reading to binary
        LD      HL,(NUM0)              ;get it from the temp register
        LD      (MTT),HL               ;and store it home
        CALL    ADTSK                  ;get A/D readings on both
channels
;
        LD      HL,01                  ;set calcualation suubroutine
job
        LD      (CALCJB),HL            ;at level 1
        CALL    CALCS                  ;do calculations
;
        CALL    MNUPNT                 ;paint variables on main
display
;
        JP      DATLP1
;
DATDON: LD      HL,02                  ;else do done processing
        LD      (CALCJB),HL            ;do calcullations at level 2
        CALL    CALCS
```

```
;
         LD      A,(RTGNUM)          ;get concrete ratng nuumber
from CALCS
         CP      100                 ;is it an error code from
FORTRAN
         JP      Z,DATLP1            ;if so than get another
reading!
         LD      B,0                 ;else, initialize reg B
         LD      C,A                 ;put rating number in
multiplier
         LD      D,13                ;and multiplicant=number of
skips
         CALL    MULT
         LD      HL,CONTBL           ;get starting addres of rating
table
         ADD     HL,BC               ;generate pointer to proper
string
         LD      DE,CONRTG           ;load destination address
         LD      BC,12               ;and string of 12 characters
         LDIR                        ;move block.
;
         LD      C,79                ;set up character count
         LD      A,' '               ;initialize to blanks,
         LD      HL,PR$              ;get starting point in format
print line
PR$LP:   LD      (HL),A              ;transfer blank to formatted
print line
         INC     HL                  ;increment to next address
         DEC     C                   ;decrement count
         JP      NZ,PR$LP            ;if not done,keep on truckin'
         LD      A,' '+80H           ;else,set up line terminator
character
         LD      (HL),A              ;and save in print format
line.
         RET
;
KEYCHK:
         XOR     A                   ;check keypad input during
data acq
         LD      (CHRFLG),A
         LD      A,(CHRIN)
         CP      DONE                ;check if DONE key
         JP      Z,ABORET            ;if DONE to premature exit
         CP      SELECT              ;check if SELECT key than
return
         JP      Z,DATDON
         JP      DATLP1              ;else keep looping
;
ABORET:  POP     HL                  ;restore stack from CALL
         XOR     A                   ;initialize menu pointers
         LD      (MNUNUM),A
         JP      MENU0               ;and go to menu 0(genesis)
;
;
;****************************************************************
;
;
;
ERPROC:  POP AF                      ;pop  error code
         LD      HL,ERR01            ;memory full message output
         XOR     A                   ;set line nmber to 0
         CALL    MOVMSG              ;send message
         LD      HL,ARMSG1           ;send push DONE message
```

```
              LD      A,01              ;into line 1
              CALL    MOVMSG            ;and   send out
      ERLP0:  CALL    KEYIN             ;wait for DONE keyto be inputted
              CP      DONE
              JP      NZ,ERLP0          ;if not keep looping
              JP      ABORET            ;else abort to menu 0
      ;
      ;
      ;                0         1         2         3         4
      ;                1234567890123456789012345678901234567890
      ARMSG1: DC       '       push  DONE  to exit             '
      ERR01:  DC       '    Memory full-no more data logging   '
      MSG1:   DC       "That's all FOLKS!"
      CRLF:   DB       CR,LF+80H
      FF$:    DB       CR,FF+80H
      ;
      ;********************************************************************
      ******
      ;
      ;       Header for printer output
      ;
      ;       0         1         2         3         4         5         6
      ;   7
      ;
      12345678901234567890123456789012345678901234567890123456789012345678 90
      123
      HD1:DC' LOCATION       TIME       LENGTH        SOUND       CONCRETE
      DEPTH       TYPE'
      HD2:DC'                (microsec)  (in)         VELOCITY    RATING
      (ft)'
      HDEND:
      ;
      END
      ;

;
      ;       ROM based Menu Forms
      ;
              PUBLIC   MNUTBL,VDBTBL,KEYTBL,KELTBL,KEMTBL,KERTBL
              PUBLIC   CONTBL,DMSG1,NUMCOD,PR$TBL,DESCRI
      ;
              EXT      NCAL,LENGTH
              EXT      SVEL,MTT,ATYPE,CONRTG,IDEPTH
              EXT      AACT,AFAC,APRO,ADATE,APIL
              EXT      ADAQ,PR$
      ;
              CSEG
      ;
      ;*************************************************************
      ;
      ;       Menu Table
      ;
      MNUTBL: DW       MENU0                      ;table of default menu
      adresses
              DW       DESCRI
              DW       DATACQ
              DW       DATOUT
              DW       DATRES
              DW       STMENU
      ;
      ;
      ;*************************************************************
      ;
```

```
;       Variable Definition Block Table
;
VDBTBL: DW      MNUODB
        DW      DESCDB
        DW      DAQUDB
        DW      DATODB
        DW      DRESDB
        DW      STMNDB
;
;***********************************************************
;
;       Print out table variables 0-7
;
PR$TBL: DW      PR$              ;start of variable 1
        DW      PR$+16           ;variable 2
        DW      PR$+27
        DW      PR$+38
        DW      PR$+47
        DW      PR$+63
        DW      PR$+73           ;variable 7
        DW      PR$+80           ;variable 0,oe unspecified
;
;***********************************************************
;
;       Menu Definitions
;
;                        0         1         2         3         4
;                        12345678901234567890123456789012345678890
STMENU: DC      '  Use SELECT key for desired mode        '
        DC      '       then press DONE:                  '
        DC      ' Output Data           Erase Data        '
        DC      ' Resume Data Taking                      '
;
; ;                      0         1         2         3         4
;                        12345678901234567890123456789012345678890
MENU0:  DC      '  Use SELECT key for desired mode        '
        DC      '       then press DONE:                  '
        DC      ' Test Description                        '
        DC      ' Data Acquisition      Data Output       '
;
;                        0         1         2         3         4
;                        12345678901234567890123456789012345678890
DESCRI: DC      'Activity:                                '
        DC      'Facility Name:                           '
        DC      'Property Record number:                  '
        DC      'Date:              Pile or Bulkhead:P    '
;
;                        0         1         2         3         4
;                        12345678901234567890123456789012345678890
DATACQ: DC      'Data Location:         Depth:      ft    '
        DC      '  use SELECT key to record data...       '
        DC      '                                         '
        DC      'Transit time:     '
        DB      0E4H    ;micro symbol
        DC      'sec  Length:      in    '
;
;                        0         1         2         3         4
;                        12345678901234567890123456789012345678890
DATOUT: DC      ' Use SELECT for desired output           '
        DC      '       then press DONE:                  '
        DC      ' PRINTER         COMPUTER         EXIT   '
        DC      'Baud:1200  Bits:8   Stop:2   Parity:odd  '
;
```

```
;                       0         1         2         3         4
;                       1234567890123456789012345678901234567890
        DATRES: DC      'Data location:         Depth:    ft '
                DC                                                  
                DC      'Transit time:          '
                DB      0E4H    ;micro symbol
                DC                                                  
                DC      'sec         Length:   in '
                DC      'Sound velocity:        ft/sec Type:      '
                DC      'Concrete rating:                          '
;***************************************************************
;
;       Menu variable definition block
        STMNDB:                         ;startup menu choices
        OUTDAT: DB      3,13,1          ;output data?
                DW      ABLANK
        REDAT:  DB      4,20,1          ;resume data taking
                DW      ABLANK
        ERADAT: DB      3,34,1          ;erase data,start anew.
                DW      ABLANK
                DB      0
;
        MNU0DB:                         ;MENU0 variable locations
        DESVDB: DB      3,18,1          ;line number,column,characters
                DW      ABLANK          ;pointer to variable,00=dummy pointer
        DATVDB: DB      4,18,1          ;line number,col,number of characters
                DW      ABLANK
        DAOVDB: DB      4,35,1
                DW      ABLANK
                DB      0               ;end of VDB
;
        DESCDB:
        ACTVDB: DB      1,10,10         ;line number,columns,characters
                DW      AACT
        FACVDB: DB      2,15,10
                DW      AFAC
        PROVDB: DB      3,24,10
                DW      APRO
        DAYVDB: DB      4,7,12
                DW      ADATE
        PILVDB: DB      4,37,1
                DW      APIL
                DB      0               ;end of VDB
;
;
        DAQUDB:
        DAQLOC: DB      1,15,10
                DW      ADAQ
        DAQDEP: DB      1+0C0H,32,3
                DW      IDEPTH
        DAQMTT: DB      4+0C0H,14,4
                DW      MTT
        DAQLEN: DB      4+0C0H,32,2
                DW      LENGTH
                DB      0               ;end of VDB
        DATODB:
        DATPR:  DB      3,09,1          ;line number,column,characters
                DW      ABLANK
        DATCOM: DB      3,26,1
                DW      ABLANK
        DAEXIT: DB      3,39,1
                DW      ABLANK
                DB      0
;
;
```

```
    DRESDB: DB      1+(01 SHL 3),15,10
            DW      ADAQ
            DB      1+80H+(06 SHL 3),35,3
            DW      IDEPTH
            DB      2+80H+(02 SHL 3),14,4
            DW      MTT
            DB      2+80H+(03 SHL 3),35,2
            DW      LENGTH
            DB      3+80H+(04 SHL 3),16,5
            DW      SVEL
            DB      3+(07 SHL 3),35,1
            DW      ATYPE
            DB      4+(05 SHL 3),18,12
            DW      CONRTG
            DB      0
;
    DMSG1:  DB      00,1FH,77H,3DH   ;' bAd' message
;
    NUMCOD: DB      07EH             ;'0'
            DB      030H             ;'1'
            DB      06DH             ;'2'
            DB      079H             ;'3'
            DB      033H             ;'4'
            DB      05BH             ;'5'
            DB      01FH             ;'6'
            DB      070H             ;'7'
            DB      07FH             ;'8'
            DB      073H             ;'9'
            DB      000H             ;' '
;
    ABLANK: DB      ' '              ;a blank ASCII variable
    CONTBL: DC      'Excellent    '  ;   >15000    ft/sec
            DC      'Good         '  ;12000-15000  ft/sec
            DC      'Questionable '  ;10000-12000  ft/sec
            DC      'Poor         '  ;7000 -10000  ft/sec
            DC      'Very poor    '  ;   <7000     ft/sec
    ACALIB: DC      'Calibration  '  ;calibration message
;
;***************************************************************
**
;
;       Keypad decoding tables
;       KEYTBL- unshifted table
;       KELTBL- shift left table
;       KEMTBL- shift middle table
;       KERTBL- shift right table
;
    KEYTBL: DB      001,002,003,004
            DB      005,'3','2','1'              ;unshifted keypad codes
            DB      006,'6','5','4'
            DB      '0','9','8','7'
;
    KELTBL: DB      000,000,000,000
            DB      000,'G','D','A'              ;shift left keypad codes
            DB      000,'P','M','J'
            DB      '+','Y','V','S'
;
    KEMTBL: DB      000,000,000,000
            DB      000,'H','E','B'              ;shift middle keypad codes
            DB      000,'Q','N','K'
            DB      '-','Z','W','T'
;
```

```
KERTBL: DB      000,000,000,000             ;shift right keypad codes
        DB      000,'I','F','C'
        DB      000,'R','O','L'
        DB      ' ','/','X','U'
;
        END
;
        PUBLIC  RAMDISP,DISPTR,MNUPTR,VDBPTR,KEYPTR,LINPTR,COLPTR
        PUBLIC  VARPTR,CHRMAX,CHRCNT,CHRNUM,CHRIN,CHRFLG,MNUNUM,VDBNUM
        PUBLIC  NUM0,NUM1,NUMD0,NUMD1,NUMD2
        PUBLIC  ASCLEN,ASCPTR,ASCBUF,ASCEND,M24RAM
        PUBLIC  AACT,AFAC,APRO,ADATE,APIL,STRBEG,STREND
        PUBLIC  ADAQ,CONRTG
        PUBLIC  OUTPTR,OUTDES,OUTBUF,OUTCNT,PKFLG
        PUBLIC  UFLAG,UOCNT,UOBPTR,UICNT,UIBPTR,UIBUFF,USTORE,VDBREQ
        PUBLIC  DISBUF,SYMB
        PUBLIC  PR$,PR$PTR,PRTPTR
        PUBLIC  MNUOLD
;
        DSEG
;
RAMDISP:DS      160                 ;display mapped into RAM
DISPTR: DS      02                  ;pointer to character in RAM display
MNUPTR: DS      02                  ;pointer to current menu
VDBPTR: DS      02                  ;pointer to current variable def block
KEYPTR: DS      02                  ;pointer to current keypad table
;
LINPTR: DS      01                  ;current line pointer
COLPTR: DS      01                  ;current column pointer
CHRMAX: DS      01                  ;maximum chracter count allowed
current VDB
VARPTR: DS      02                  ;pointer to the numeric variable in
RAM
CHRCNT: DS      01                  ;number of characters inputted
CHRNUM: DS      01                  ;number of characters to output
CHRIN:  DS      01                  ;character inputted from keypad
CHRFLG: DS      01                  ;flag 1=chararcter received 0=not rcvd
PKFLG:  DS      01                  ;flag 1=peak detection received
;
MNUNUM: DS      02                  ;currently active index to menu table
MNUOLD: DS      02                  ;storage for calling menu
VDBNUM: DS      02                  ;currently active index to variable
def table
VDBREQ: DS      01                  ;last used VDB in menu 0
;
STRBEG:                             ;ASCII string variables
AACT:   DS      10                  ;activity name
AFAC:   DS      10                  ;facility name
APRO:   DS      10                  ;property number
ADATE:  DS      12                  ;date
APIL:   DS      01                  ;pile/blhead
ADAQ:   DS      10                  ;data acquisition location
CONRTG: DS      12                  ;concrete rating
STREND:
;
NUM0:   DS      01                  ;temporary storage for binary number
NUM1:   DS      01                  ;in ASCII/Binary conversion routine
;
NUMD0:  DS      01                  ;temporary strage for BCD number in
NUMD1:  DS      01                  ;ASCII/Binary conversion
NUMD2:  DS      01
;
DISBUF:                             ;display buffer for the LCD codes
```

| | | | |
|---|---|---|---|
| SYMB: | DS | 05 | |
| ASCLEN: | DS | 01 | ;lenght of ASCII string to be converted |
| ASCPTR: | DS | 02 | ;pointer to ASCII numeric string input buffer |
| ASCBUF: | DS | 06 | ;temporary storage of ASCII string |
| ASCEND: | | | ;LSB of numeric string |
| M24RAM: | DS | 153 | |
| UFLAG: | DS | 01 | ;carriage return received, valid command? |
| USTORE: | DS | 01 | ;temporary storage of UART status register |
| UOCNT: | DS | 01 | ;charcter count for output |
| UOBPTR: | DS | 02 | ;pointer to UART output buffer |
| UICNT: | DS | 01 | ;input character count |
| UIBPTR: | DS | 02 | ;pointer to UART input buffer |
| UIBUFF: | DS | 10 | ;input buffer |
| PRTPTR: | DS | 02 | ;points to print position at output |
| PR$PTR: | DS | 02 | ;pointer to printer formatted output line |
| PR$: | DS | 80+15 | ;printer output format line |
| OUTCNT: | DS | 01 | ;counts number of block data transfers |
| OUTPTR: | DS | 02 | ;pointer to ouutput buffer(OUTBUF) |
| OUTDES: | DS | 160 | ;description buffer storage |
| OUTBUF: | DS | 94*160 | ;calibration and data acqisition |

```
        COMMON/VAR/
        PUBLIC  ATYPE,DPFLG,ORFLG,RTGNUM,NCAL
        PUBLIC  CALCJB,SVEL,MTT,LENGTH,IDEPTH,ADBUF
;
```

| | | | |
|---|---|---|---|
| ATYPE: | DS | 01 | ;type of data,I=indirect D=direct |
| DPFLG: | DS | 01 | ;decimal pt flag |
| ORFLG: | DS | 01 | ;overrange flag |
| RTGNUM: | DS | 01 | ;index to rating table |
| NCAL: | DS | 02 | ;number of calibration cycles |
| CALCJB: | DS | 02 | ;computed goto in CALCS index |
| SVEL: | DS | 02 | ;sound velocity calculation |
| MTT: | DS | 02 | ;measured transit time |
| LENGTH: | DS | 02 | ;concrete thickness measuement |
| IDEPTH: | DS | 02 | ;depth of hammer in ft |
| ADBUF: | DS | 32 | ;allocate for 8 real channels |

END

What is claimed is:

1. A system for testing the quality of a solid concrete structure, comprising:

means for applying ultrasonic pulses to said solid concrete structure;

means for detecting the ultrasonic pulses and producing corresponding signals that are indicative of ultrasonic pulses that have passed through said solid concrete structure;

signal processing means for processing the signals to determine the transit time of the ultrasonic pulses through said solid concrete structure; and means for disabling the signal processing means for a predetermined time after application of each ultrasonic pulse to the solid concrete structure to prevent noise produced by the means for applying ultrasonic pulses to said solid concrete structure from entering the signal processing means;

said means for disabling the signal processing means comprising:

a first Schmitt trigger circuit formed as a signal shaping circuit and connected to the means for applying ultrasonic pulses to the material;

a first monostable multivibrator connected to receive signals output from said first Schmitt trigger circuit;

a second monostable multivibrator connected to receive signals output from said first monostable multivibrator and configured to produce a pulsed signal output of predetermined duration;

a second Schmitt trigger circuit connected to receive signal inputs from said second monostable multivibrator and from said means for detecting the ultrasonic pulses, said second Schmitt trigger circuit being configured to output a signal indicative of the ultrasonic pulse that has traveled through said solid concrete structure only during time intervals when both the pulsed signal outputs from said second monostable multivibrator and said means for detecting the ultrasonic pulses are simultaneously input to said second Schmitt trigger circuit.

2. The system of claim 1 wherein said first Schmitt Trigger circuit comprises:

a first NAND gate having a first input for receiving a logic one signal, a second input connected to said means for applying ultrasonic pulses to said solid concrete structure and an output; and a second NAND gate having a first input for receiving said logic one signal, a second input connected to the output of said first NAND gate and an output connected to said first monostable multivibrator.

3. The system of claim i wherein said second Schmitt Trigger circuit comprises:

a third NAND gate having a first input connected to the output of said monostable multivibrator, a second input connected to said means for detecting the ultrasonic pulses and an output; and a fourth NAND gate having first and second inputs connected to the output of said third NAND gate and an output for providing said signal indicative of the ultrasonic pulse that has traveled through said solid concrete structure only during time intervals when both the pulsed signal outputs from said second monostable multivibrator and said means for detecting the ultrasonic pulses are simultaneously input to said second Schmitt trigger circuit.

4. The system of claim 1 further comprising a printer electrically coupled to said processing means for providing a report indicative of the quality of said solid concrete structure being tested.

5. The system of claim 1 further comprising a power circuit for providing at least eighteen volts direct current to said system for testing the quality of said solid concrete structure, said power circuit comprising:

a receptacle for receiving one hundred twenty volts alternating current, said receptacle having an output;

a line filter having an input connected to the output of said receptacle and an output;

a power supply having an input connected to the output of said line filter and an output, said power supply being adapted to provide approximately twenty four volts direct current to said system for testing the quality of said solid concrete structure;

a plurality of voltage regulators, each of said voltage regulators having an input connected to the output of said power supply and an output;

a rechargeable battery having an output connected to the inputs of said voltage regulators, said rechargeable battery providing approximately eighteen volts direct current to said measuring apparatus;

a momentary contact switch having a first terminal connected to the output of said battery and a second terminal;

a DC to DC convertor having an input and an output;

a transistor having an emitter, a base and a collector, said base and said collector being connected to the output of said DC to DC converter and said emitter being connected to the output of one of said voltage regulators;

a zener diode having an anode connected to the base of said transistor and a cathode connected to the inputs of said voltage regulators;

a normally open switch having a pair of normally open contacts, the first normally open contact of said normally open switch being connected between said line filter and said power supply and the second normally open contact of said normally open switch being connected between the output of said battery and the inputs of said voltage regulators;

a resistor connected between the base of said transistor and the output of said DC to DC converter; and a relay having a pair of coils and at least two contact, the first coil of said relay being connected to the second terminal of said momentary contact switch such that when said momentary contact switch is closed the first coil of said relay is energized closing the two contacts of said relay to electrically connect the output of said battery to the inputs of said plurality of voltage regulators and the input of said DC to DC converter when the second normally open contact of said normally open switch is closed;

the second coil of said relay being connected to the emitter of said transistor such that when said transistor is turned on the second coil of said relay is energized and the two contacts of said relay are opened electrically disconnecting said battery from said voltage regulators and said DC to DC converter.

6. The system of claim 5 wherein said rechargeable battery comprises a lead acid battery.

7. The system of claim 1 further comprising a battery charger electrically connected to said battery for recharging said battery when the voltage of said battery drops below approximately eighteen volts.

8. The system of claim 1 further comprising keypad means electrically coupled to said signal processing means for entering data into said signal processing means.

9. The system of claim 1 further comprising an encoder electrically connected between said keypad means and said signal processing means.

* * * * *